(12) United States Patent
Kasajima et al.

(10) Patent No.: US 6,671,131 B2
(45) Date of Patent: Dec. 30, 2003

(54) PRECISE POSITIONING ACTUATOR FOR HEAD ELEMENT, HEAD GIMBAL ASSEMBLY WITH THE ACTUATOR AND MANUFACTURING METHOD OF HEAD GIMBAL ASSEMBLY

(75) Inventors: Tamon Kasajima, Kwai Chung (HK); Masashi Shiraishi, Kwai Chung (HK)

(73) Assignee: SAE Magnetics (H. K.) Ltd., Kwai Chung (HK)

( * ) Notice: Subject to any disclaimer, the term of this patent is extended or adjusted under 35 U.S.C. 154(b) by 88 days.

(21) Appl. No.: 10/108,412

(22) Filed: Mar. 29, 2002

(65) Prior Publication Data

US 2002/0141117 A1 Oct. 3, 2002

(30) Foreign Application Priority Data

Apr. 2, 2001 (JP) ........................................ 2001-103204

(51) Int. Cl.[7] .............................................. G11B 21/24
(52) U.S. Cl. .................................................... 360/294.4
(58) Field of Search ........................... 360/294.4–294.7, 360/234.6–234.8, 264.5–264.7, 245.5–245.9

(56) References Cited

U.S. PATENT DOCUMENTS 6,549,375 B1 * 4/2003 Crane et al. ............. 360/245.3
6,574,077 B1 * 6/2003 Crane et al. ............. 360/294.3
6,600,634 B1 * 7/2003 Kim et al. ................ 360/294.5

OTHER PUBLICATIONS

U.S Application No. 09/972,939; filed Oct. 10, 2001.
J. Akedo, "Deposition method using an ultrafine particle beam and its application to microfabrication", Jpn. Appl. Phys., vol. 68, No. 1, 1999, pp. 44–47.

* cited by examiner

Primary Examiner—Allen Cao
(74) Attorney, Agent, or Firm—Burns, Doane, Swecker & Mathis, L.L.P.

(57) ABSTRACT

A precise positioning actuator to be fixed to a head slider provided with at least one head element and to a support, for precisely positioning the at least one head element includes a pair of movable arms and a coupling section. Each movable arm is formed by a metal plate to be substantially in parallel with a side surface of the head slider. Top end sections of the pair of movable arms are capable of displacing in response to a drive signal applied to the actuator along a direction crossing planes of the metal plate. The coupling section is connected between the top end sections of the pair of movable arms and formed by a metal plate to be substantially in parallel with a first surface of the head slider. This first surface is opposite to an air bearing surface (ABS) of the head slider. The first surface of the head slider is to be fixed to the coupling section.

38 Claims, 24 Drawing Sheets

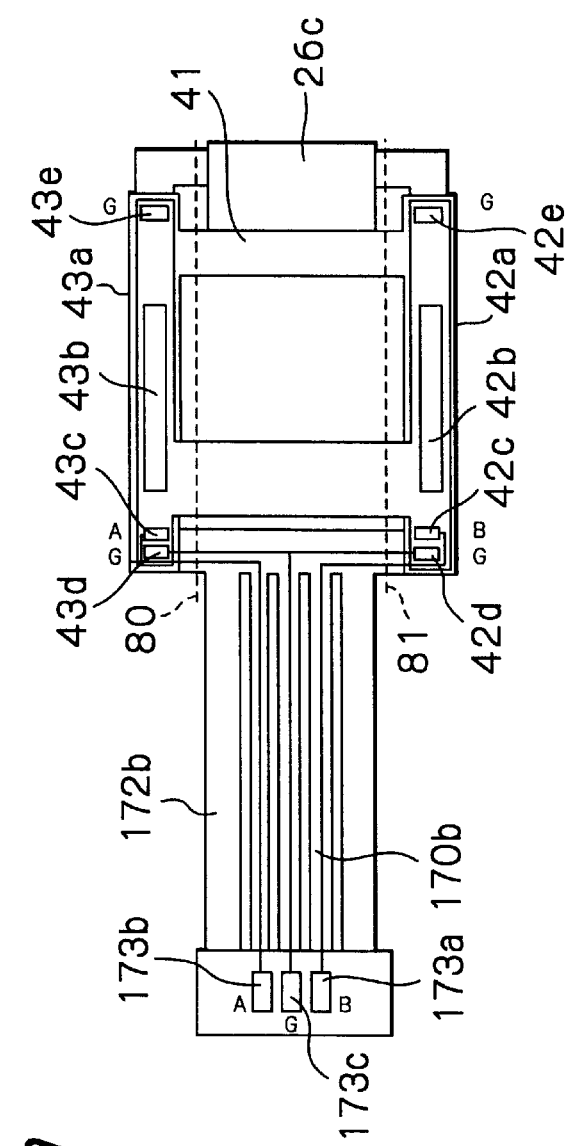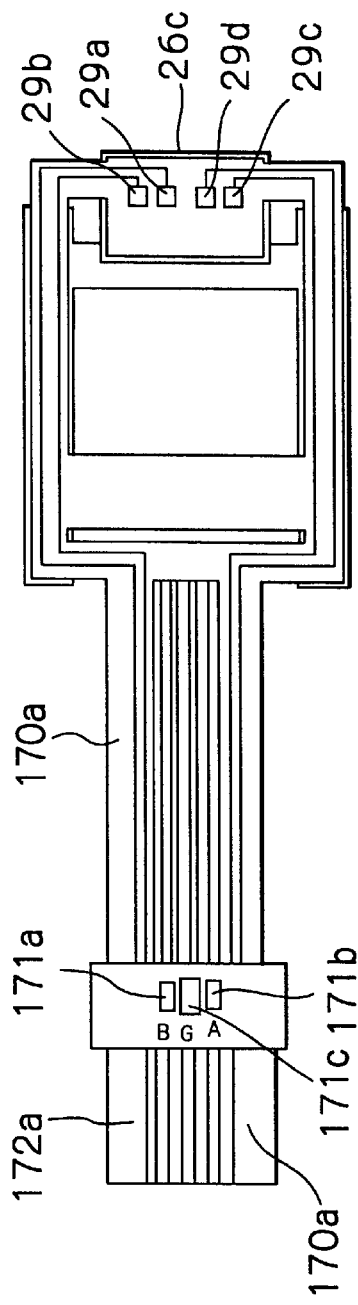
Fig. 18a
Fig. 18b

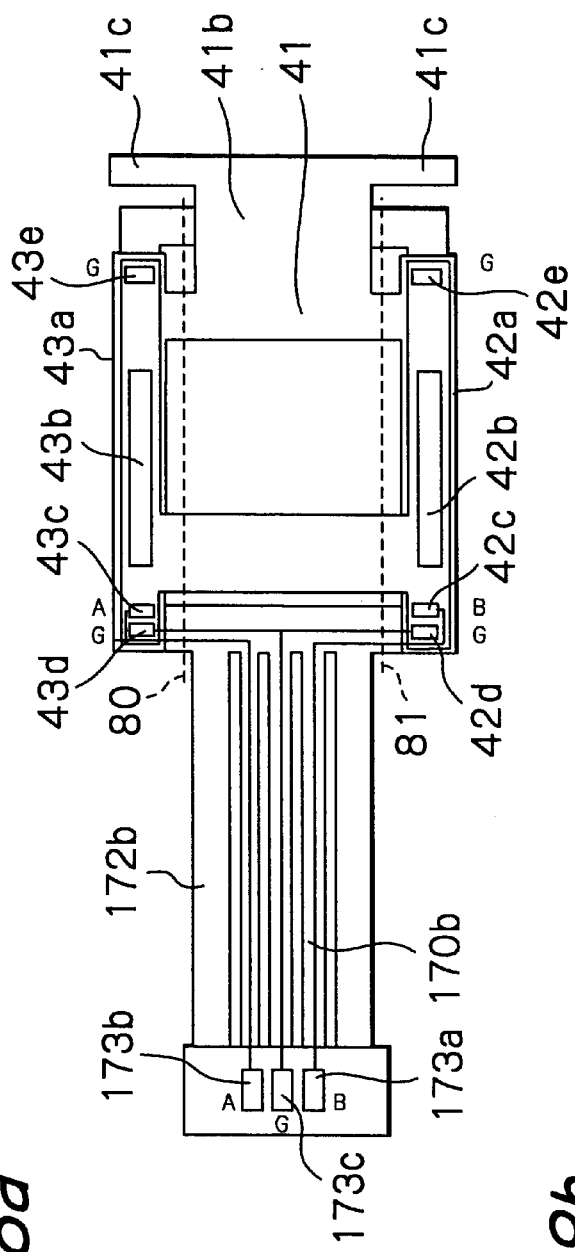
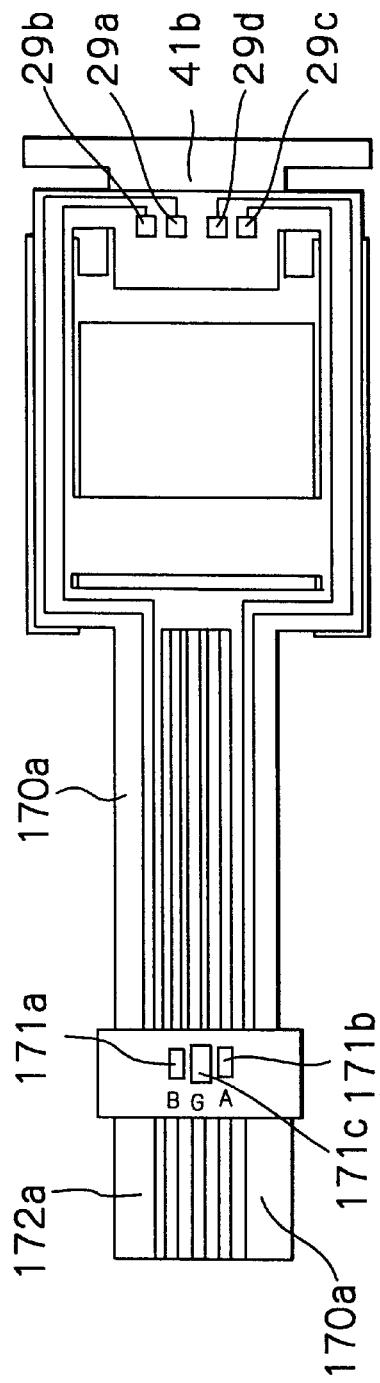
Fig. 28a
Fig. 28b

PRECISE POSITIONING ACTUATOR FOR HEAD ELEMENT, HEAD GIMBAL ASSEMBLY WITH THE ACTUATOR AND MANUFACTURING METHOD OF HEAD GIMBAL ASSEMBLY

FIELD OF THE INVENTION

The present invention relates to a precise positioning actuator for a head element such as a thin-film magnetic head element or an optical head element, to a head gimbal assembly (HGA) with the actuator and to a manufacturing method of an HGA.

DESCRIPTION OF THE RELATED ART

In a magnetic disk drive apparatus, thin-film magnetic head elements for writing magnetic information into and/or reading magnetic information from magnetic disks are in general formed on magnetic head sliders flying in operation above the rotating magnetic disks. The sliders are supported at top end sections of suspensions of HGAs, respectively.

Recently, recording and reproducing density along the radial direction or along the track width direction in the magnetic disk (track density) rapidly increase to satisfy the requirement for ever increasing data storage capacities and densities in today's magnetic disk drive apparatus. For advancing the track density, the position control of the magnetic head element with respect to the track in the magnetic disk by a voice coil motor (VCM) only has never presented enough accuracy.

In order to solve this problem, an additional actuator mechanism is mounted at a position nearer to the magnetic head slider than the VCM so as to perform fine precise positioning that cannot be realized by the VCM only. The techniques for realizing precise positioning of the magnetic head are described in for example U.S. Pat. No. 5,745,319 and Japanese patent publication No. 08180623 A.

As for a precise positioning actuator, there are various structures of actuator such as for example a load-beam structure actuator and a piggyback structure actuator.

The load-beam structure actuator has two piezoelectric elements of PZT attached on a load beam of a suspension. These PZT elements are driven in a manner to support with each other to displace the load beam so as to perform fine precise positioning of magnetic head slider mounted on the load beam.

The piggyback structure actuator is formed by piezoelectric material of PZT in an I-character shape with one end section to be fixed to a suspension, the other end section to be fixed to a magnetic head slider and a pillar shaped movable arm connected between these end sections. The PZT is driven to perform fine precise positioning of the magnetic head slider directly attached to this actuator. On the suspension, stepwise stacked are the actuator and the magnetic head slider, namely, the actuator is caught between the suspension and the slider to form a stacked cantilever structure.

However, the aforementioned conventional precise positioning actuators had following various problems:

(1) Mechanical resonance was occurred at a relatively low frequency;
(2) Since the actuator as a whole consists of piezoelectric material such as PZT of a brittle material, shock resistance is very poor. Particularly, since in case of a piggy-back structure actuator, the actuator and the magnetic head slider are stacked to form a cantilever structure, a shock easily occurs with a moment and also shock resistance is extremely poor;
(3) Depending upon the size of the magnetic head slider, a travel of the magnetic head element during the precise positioning operation varies. Thus, it is difficult to obtain enough stroke;
(4) Handling at the time of an assembly of the HGA is very difficult;
(5) Particularly, in case of a piggy-back structure actuator, because of the stepwise stacked structure, a total thickness of the HGA around the magnetic head slider increases by the thickness of the actuator;
(6) In case of a piggy-back structure actuator, because of three-dimensional and complicated attachment structure, the handling at the time of an assembly of the HGA is extremely difficult and it is impossible to use a conventional HGA assembly equipment causing productivity to be very worse; and
(7) In order not to interfere with the movement of the piggy-back structure actuator, it is necessary to assemble with keeping a gap between the actuator and the magnetic head slider and also between the actuator and the suspension. However, forming of such gaps will more decrease the shock resistance and it is difficult to precisely keep the gaps constant. Particularly, since it is difficult to keep the suspension, the actuator and the magnetic head slider in parallel precisely, the head characteristics deteriorates.

To solve the aforementioned various problems, the inventors of this application had proposed an actuator provided with a pair of metal plate movable arms for fixing and catching a magnetic head slider in a space between the movable arms (U.S. patent Ser. No. 09/972,939 now pending).

However, this actuator has the structure for catching side surfaces of the magnetic head slider in the movable arms and thus has the following problems:

(A) It is difficult to fix the magnetic head slider with a sufficient strength;
(B) A resistance against a shock toward its up-and-down directions that intersect the magnetic disk surface is extremely poor; and
(c) It is impossible to commonly adopt magnetic head sliders with different width, namely different distances between the side faces, from that of the standard magnetic head slider.

SUMMARY OF THE INVENTION

It is therefore an object of the present invention to provide a precise positioning actuator for a head element, an HGA with the actuator and a manufacturing method of an HGA, whereby fixing between the actuator and a head slider can be achieved with a sufficient strength.

Another object of the present invention is to provide a precise positioning actuator for a head element, an HGA with the actuator and a manufacturing method of an HGA, whereby a shock resistance toward up-and-down directions can be greatly improved.

Further object of the present invention is to provide a precise positioning actuator for a head element, an HGA with the actuator and a manufacturing method of an HGA, hereby a head slider with a different size from a standard head slider can be easily mounted to the actuator.

According to the present invention, a precise positioning actuator to be fixed to a head slider provided with at least one head element and to a support, for precisely positioning the at least one head element includes a pair of movable arms and a coupling section. Each movable arm is formed by a metal plate to be substantially in parallel with a side surface of the head slider. Top end sections of the pair of movable arms are capable of displacing in response to a drive signal applied to the actuator along a direction crossing planes of the metal plate. The coupling section is connected between the top end sections of the pair of movable arms and formed by a metal plate to be substantially in parallel with a first surface of the head slider. This first surface is opposite to an air bearing surface (ABS) of the head slider. The first surface of the head slider is to be fixed to the coupling section.

Since the actuator is provided with a coupling section connected between the top end sections of the pair of movable aims and the head slider is to be fixed to this coupling section, fixing of the slider can be achieved with sufficient strength and a shock resistance against up-and-down movements can be greatly improved. Also, head sliders with different widths can be easily mounted to the actuator.

Further, the movable arms and the coupling section are mainly made from a metal plate, the weight of the whole actuator can be reduced and thus a mechanical resonance frequency of the actuator can be increased. Also, as a basic member of the arms is formed by the metal plate that is strong and light-weighted, a shock resistance of the movable arms that are particularly weaken for the shock can be greatly improved. Due to the usage of the metal plate provided with a high mechanical strength, treatment of the actuator during assembling of the HGA becomes very easy. By using the metal plate to form the main portion of the actuator, the flexibility on a design of the actuator will improve with the shape and/or size. Thus, it is enabled to design the actuator with a sufficient stroke. Furthermore, because the metal plate can be precisely machined, accuracy in size of the actuator itself can be greatly improved.

Also, since the head slider will be mounted in a space between the movable arms, the thickness of the HGAL around the head slider does not increase even if the actuator is attached. Thus, no modifications in size of the disk drive apparatus due to the mounting of the actuator is necessary.

In addition, since the head slider is caught in between the movable arms, the top end sections of the movable arms, which actually transfer the displacement to the slider, can be extended to always position at the top end of the slider. Thus, it is possible to provide a constant travel to the slider even if the size of the head slider changes, and therefore an enough stroke of the head at the precise positioning operation can be always obtained.

Because of a partial fixing of the head slider to the coupling section of the actuator, shape change in the ABS of the head slider (generation of crown or camber) can be prevented from occurring even if the adhesive deforms due to change in atmosphere temperature.

It is preferred that the actuator further includes a base section formed by a metal plate that is in parallel with the coupling section, and fixed to the support, the pair of movable arms extending forward from the base section. As not only the movable arms and the coupling section but also the base section are made from a metal plate, the weight can be more reduced and a shock resistance can be more improved. Also, accuracy in size of the actuator itself can be greatly improved.

It is also preferred that the pair of movable arms also extend backward from the base section.

It is preferred that the pair of movable arms, the base section and the coupling section have a U-shaped section structure formed by bending a single metal plate. Since the main portion of the actuator is configured by bending a single metal plate, its fabrication becomes easy and a mechanically strong actuator can be provided.

It is further preferred that the base section has a strip shape or that the base section includes a strip and a projection protruded forward form the strip.

It is also preferred that the coupling section has a strip shape or that the coupling section includes a strip and a projection protruded forward from the strip. Preferably, the coupling section further includes lateral jutting portions protruded from the projection so as to operate as a limiter for preventing a top end section of the actuator from excessively moving toward up-and-down directions when a shock is applied.

It is preferred that each of the pair of movable arms consists of an arm member made of the metal plate, and a piezoelectric element formed or adhered on a side surface of the arm member. In this case, the piezoelectric element has a multi-layered structure or a single layer structure of a piezoelectric material layer and of an electrode layer. If the piezoelectric element is formed in the multi-layered structure, sufficient displacement will be obtained at low drive voltage and a horizontal shock resistance will be increased.

It is preferred that the metal plate is a stainless steel plate.

It is more preferred that conductor traces for transmitting signals of the head element are formed on the pair of movable arms. Since the trace conductors connected to head element connection pads are formed on the movable arms, all the trace conductors connected to the head element and the actuator can be provided by a conductor pattern fabricated in the same process. Therefore, the traces become simple and also the manufacturing cost can be reduced. Furthermore, since the signal conductor traces are adhered in parallel on the movable arms, the movement direction of the arms intersect the plane of the conductor traces. Thus, not only the resistance against the displacement of the movable arms will decrease but also the trace conductors will not forcedly bend causing no damage to them.

It is preferred that the at least one head element is at least one thin-film magnetic head element.

According to the present invention also an HGA includes a head slider provided with at least one head element, a support and above-mentioned precise positioning actuator fixed to the head slider and to the support.

It is preferred that the coupling section of the actuator and the head slider are fixed by adhering. More preferably, the coupling section of the actuator and the head slider are adhered by a conductive adhesive. In case of using a conductive adhesive, the body of the head slider can be easily grounded through the actuator. It is also preferred that the actuator and the support are fixed by adhering or by laser welding.

According to the present invention further, a manufacturing method of an HGA includes a step of preparing a head slider provided with at least one head element, a support and a precise positioning actuator having a pair of movable arms each formed by a metal plate to be substantially in parallel with a side surface of the head slider, top end sections of the pair of movable arms being capable of displacing in response to a drive signal applied to the actuator along a direction crossing planes of the metal plate, a coupling section connected between the top end sections of the pair of movable arms and formed by a metal plate to be substantially in parallel with a first surface of the head slider, the first surface being opposite to an ABS of the head slider, and a base section formed by a metal plate that is in parallel with the coupling section, the pair of movable arms extending forward from the base section, a step of fixing the first surface of the head slider to the coupling section of the actuator, and a step of then fixing the base section of the actuator with the head slider to the support.

First, the head slider is fixed to the coupling section of the actuator, and then the actuator with the head slider is fixed to the support. Since assembling of the head slider and the actuator can be carried out on the flat plate, alignment of the slider and the actuator becomes easy resulting that a higher accuracy assembling can be expected. Also, since a thermosetting adhesive with excellent curing performance although it needs a long curing time can be used, a high quality assembly of the head slider and the actuator can be obtained. Furthermore, since the assembly has a simple shape, adhesion and electrical connection of the assembly with a suspension can be performed by using a general HGA assembling equipment resulting the productivity to extremely improve and thus the manufacturing cost to reduce. In addition, due to the usage of the metal plate provided with a high mechanical strength, treatment of the actuator during assembling of the HGA becomes very easy. Further, as aforementioned, fixing of the slider can be achieved with sufficient strength and a shock resistance against up-and-down movements can be greatly improved. Also, head sliders with different widths can be easily mounted to the actuator.

Also, according to the present invention, a manufacturing method of an HGA includes a step of preparing a head slider provided with at least one head element, a support and a precise positioning actuator having a pair of movable arms each formed by a metal plate to be substantially in parallel with a side surface of the head slider, top end sections of the pair of movable arms being capable of displacing in response to a drive signal applied to the actuator along a direction crossing planes of the metal plate, a coupling section connected between the top end sections of the pair of movable arms and formed by a metal plate to be substantially in parallel with a first surface of the head slider, the first surface being opposite to an ABS of the head slider, and a base section formed by a metal plate that is in parallel with the coupling section, the pair of movable arms extending forward from the base section, a step of fixing the base section of the actuator to the support, and a step of then fixing the first surface of the head slider to the coupling section of the actuator.

Since the base section and the movable arms extending forward from the base section of the actuator are formed by a metal plate, the mechanical strength of the actuator become high. Thus, treatment of the actuator during assembling of the HGA becomes very easy. Further, as aforementioned, fixing of the slider can be achieved with sufficient strength and a shock resistance against up-and-down movements can be greatly improved. Also, head sliders with different widths can be easily mounted to the actuator.

It is preferred that the method further includes a step of inserting a spacer between the base section of the actuator and the head slider before the step of fixing the head slider to the coupling section. By using the spacer, necessary gap can be very easily formed.

It is also preferred that the step of preparing the actuator includes bending a metal plate to form the pair of movable arms, the coupling section and the base section. Since the main portion of the actuator is configured by bending a single metal plate, its fabrication becomes easy and a mechanically strong actuator can be provided.

Further objects and advantages of the present invention will be apparent form the following description of the preferred embodiments of the invention as illustrated in the accompanying drawings.

BRIEF DESCRIPTION OF THE DRAWINGS

FIGS. 18a and 18b are plane views schematically illustrating a conductor sheet attached on an actuator in the modification of FIG. 17;

FIGS. 28a and 28b are plane views schematically illustrating a conductor m formed on the actuator in the embodiment of FIG. 25;

DESCRIPTION OF THE PREFERRED EMBODIMENTS

Figure 1:
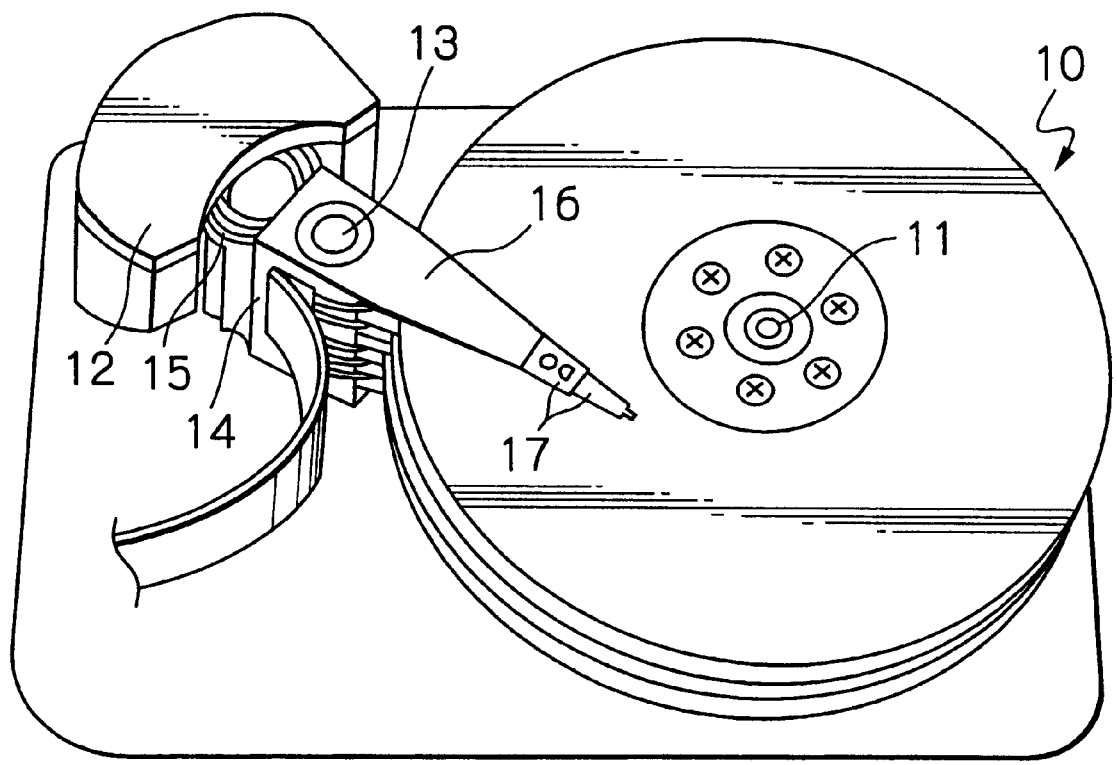
FIG. 1 is an oblique view schematically illustrating main components of a magnetic disk drive apparatus in a preferred embodiment according to the present invention.
Figure 2:
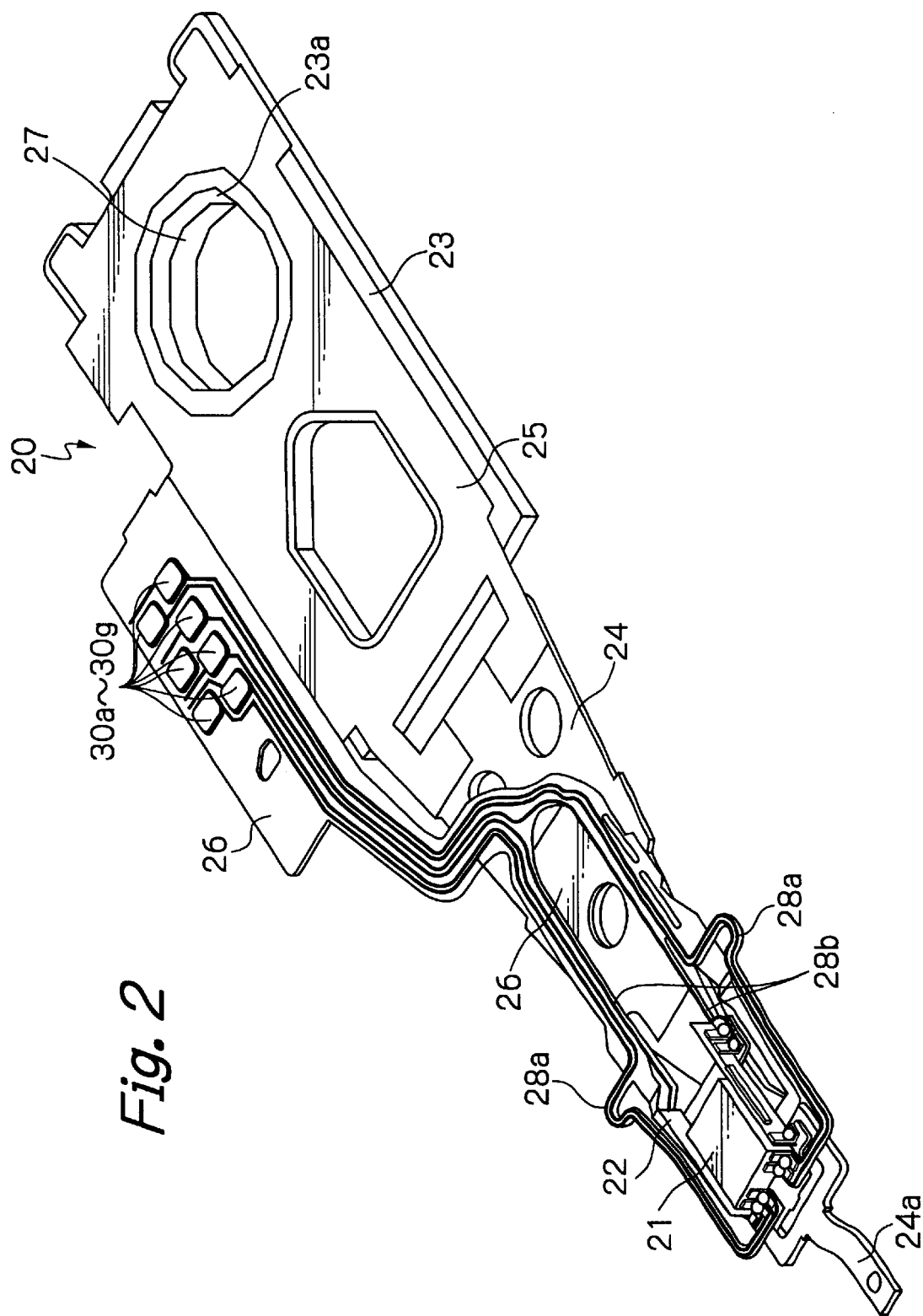
FIG. 2 is an oblique view illustrating the whole structure of an HGA in the embodiment of FIG. 1.
Figure 3:
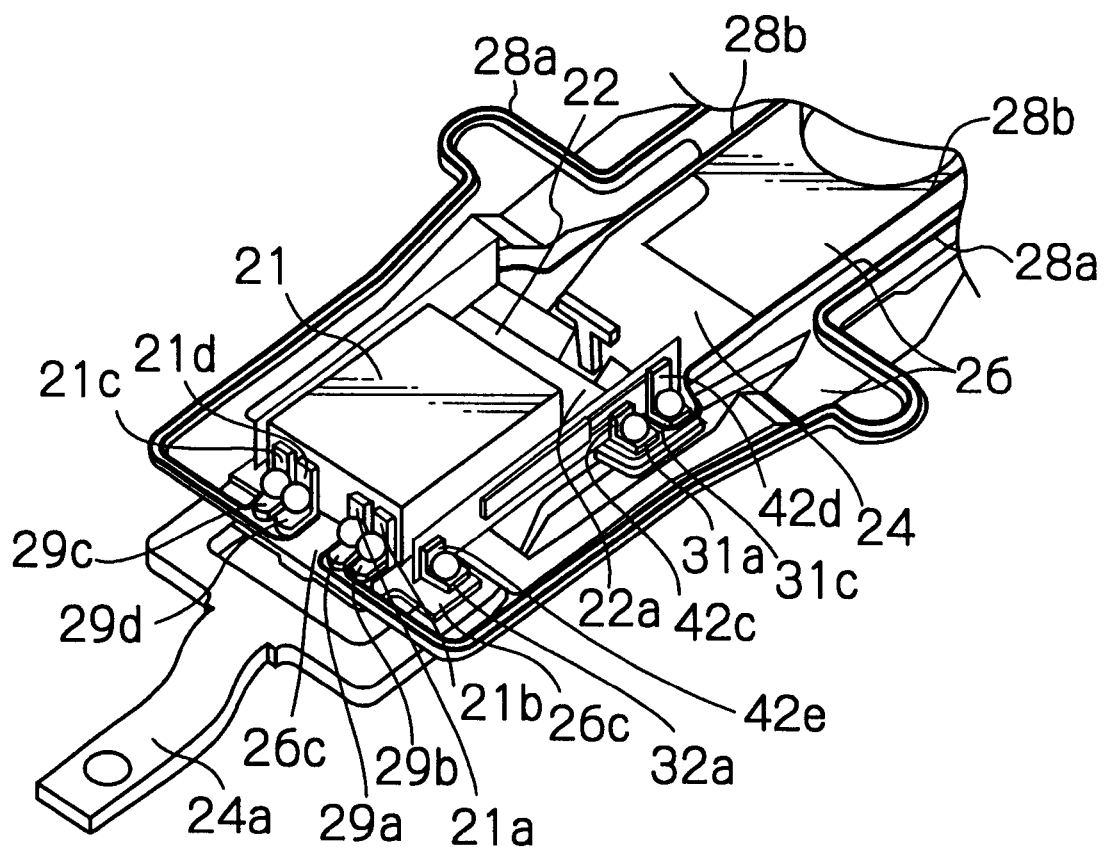
FIG. 3 is an oblique view illustrating a top end section of the HGA in the embodiment of FIG. 1.

FIG. 1 illustrates main components of a magnetic disk unit of a preferred embodiment according to the present invention, FIG. 2 illustrates the whole structure of an HGA in this embodiment, and FIG. 3 illustrate a top end section of the HGA in this embodiment.

In FIG. 1, reference numeral 10 denotes a plurality of magnetic hard disks rotating around an axis 11, and 12 denotes an assembly carriage device for positioning each magnetic head element on a track of each disk. The assembly carriage device 12 is mainly constituted by a carriage 14 capable of rotating around an axis 13 and a main actuator 15 such as for example a voice coil motor (VCM) for driving the carriage 14 to rotate.

Base sections at one ends of a plurality of drive aims 16 stacked along the axis 13 are attached to the carriage 14, and one or two HGAs 17 are mounted on a top section at the other end of each arm 16. Each of the HGAs 17 has a slider mounted at its top end section so that the slider opposes to one surface (recording and reproducing surface) of each of the magnetic disks 10.

As shown in FIGS. 2 and 3, the HGA is assembled by fixing a fine tracking actuator 22 for precise positioning of a thin-film magnetic head element to a top end section of a suspension 20. A surface that is opposite to an air bearing surface (ABS) of a magnetic head slider 21 provided with the thin-film magnetic head element is fixed to the actuator 22 so that the slider 21 is caught in a space between movable arms of the actuator 22.

A main or course actuator of VCH 15 shown in FIG. 1 is used for rotationally moving the drive arm 16 to which such HGA is attached, so as to move the whole assembly. The actuator 22 contributes the fine positioning of the HGA, which cannot be adjusted by the main or course actuator 15.

The suspension 20 is substantially formed, as shown in FIGS. 2 and 3, by first and second load beams 23 and 24, a resilient hinge 25 coupled with both these first and second load beams 23 and 24, a resilient flexure 26 fixed on the second load beam 24 and the hinge 25, and a circular base plate 27 formed at an attaching section 23a of the first load beam 23.

The flexure 26 has a flexible tongue 26a (FIG. 7) depressed by a dimple (not shown) formed on the second load beam 24 at its one end section. On the tongue 26a, fixed is a base section 22a (40) of the actuator 22 via an insulation layer 26b made of for example polyimide.

The flexure 26 has elasticity for supporting flexibly the magnetic head slider 21 through the actuator 22 by this tongue 26a. The flexure 26 is made of in this embodiment a stainless steel plate (for example SUS304TA) with a thickness of about 20 $\mu$m. The flexure 26 is fixed with the second load beam 24 and with the hinge 25 at a plurality of points by pinpoint welding.

The hinge 25 has elasticity providing, to the second load beam 24, a force for pressing the magnetic head slider 21 toward the direction of a magnetic disk surface through the actuator 22 in operation. The hinge 25 is made of in this embodiment a stainless steel plate with a thickness of about 40 $\mu$m.

The first load beam 23 is made of in this embodiment a stainless steel plate with a thickness of about 100 $\mu$m, and supports the whole surface of the hinge 25. The fixing of the first load beam 23 with the hinge 25 is performed by pinpoint welding at a plurality of points.

The second load beam 24 is also made of in this embodiment a stainless steel plate with a thickness of about 100 $\mu$m, and fixed to the hinge 25 at its rear end section. The fixing of the second load beam 24 with the hinge 25 is performed also by pinpoint welding at a plurality of points. At a top end of this second load beam 24, formed is a lift-tab 24a for separating the HGA, form the magnetic-disk surface during out of operation is prepared.

The base plate 27 to be attached to the drive arm 16 shown in FIG. 1 is made of in this embodiment a stainless steel or iron plate with a thickness of about 150 $\mu$m. This base plate 27 is fixed to the attaching section 23a of the first load beam 23 by welding.

On the flexure 26, flexible first and second conductor members 28a and 28b each including a plurality of trace conductors of a thin-film multi-layered pattern are formed or disposed. The first and second conductor members 28a and 28b are formed by a known method similar to the patterning method of forming a printed circuit board on a thin metal plate such as a flexible printed circuit (FPC). For example, the first and second conductor members 28a and 28b are formed by sequentially depositing a first insulation material layer made of a resin such as polyimide with a thickness of about 5 $\mu$m, a patterned Cu layer (trace conductor layer) with a thickness of about 4 $\mu$m, and a second insulation material layer made of a resin such as polyimide with a thickness of about 5 $\mu$m on the flexure 26 in this order. Within the regions of the connection pads formed for connecting with the actuator, the magnetic head element and an external circuit, an Au layer is deposited on the Cu layer and there is no second insulation material layer on the Au layer.

In this embodiment, the first conductor member 28a includes two trace conductors connected to the magnetic head element for one side, thus four trace conductors for both sides, and the second conductor member 28b includes a trace conductor connected to the actuator 22 for one side, thus two trace conductors for both sides.

One end of the trace conductors of the first conductor member 28a is electrically connected to head element connection pads 29a–29d formed on an individually separated and freely movable section 26c of the flexure 26. The connection pads 29a–29d are ball-bonded to terminal electrodes 21a of the magnetic head slider 21 by Au bonding, wire bonding or stitch bonding. A portion of the first conductor member 28a between the separated section 26c and the flexure 26 is air-floating. No metal thin-plate is formed on the back surface of this air-floating portion of the first conductor member 28a so as to reduce the resistance for the movement of the magnetic head slider 21. The other end of the trace conductors of the first conductor member 28a is electrically connected to four connection pads of external circuit connection pads 30a–30g used for connection with an external circuit.

One end of trace conductors of the second conductor member 28b is electrically connected to actuator connection pads 31a and 31b (FIG. 7) formed on an insulation layer on the tongue 26a of the flexure 26. The connection pads 31a and 31b are connected to B channel and A channel signal terminals 42c and 43c formed on movable arms 42 and 43 of the actuator 22, respectively. The other end of trace conductors of the second conductor m 28b is electrically connected to two pads of the external circuit connection pads 30a–30g. In this embodiment, the second conductor member 28b has no ground trace conductor and thus ground connection pads 31c and 31d (FIG. 7) are directly connected to the tongue 26a of the flexure 26 so as to be grounded to the drive arm 16 through the second load beam 24, the hinge 25, the first load beam 23 and the base plate 27. Ground connection pads 32a and 32b (FIG. 7) are directly connected to the separated section 26c. The ground connection pads 31c and 31d and the ground connection pads 32a and 32b are electrically connected with each other through the metal plate member of the actuator 22.

A structure of the HGA according to the present invention is not limited to the aforementioned structure. Furthermore, although it is not shown, a head drive IC chip may be mounted on a middle of the suspension 20.

Figure 4:
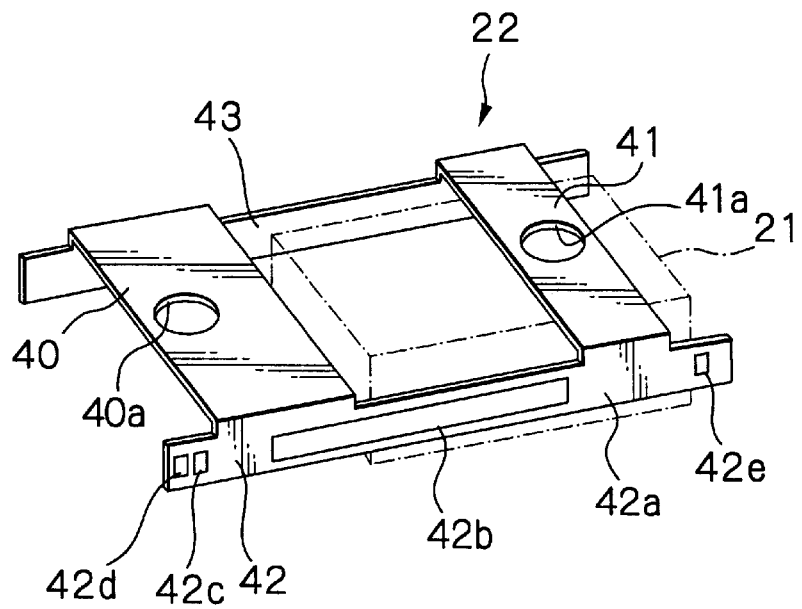
FIG. 4 is an oblique view illustrating a structure of an actuator in the embodiment of FIG. 1.
Figure 5:
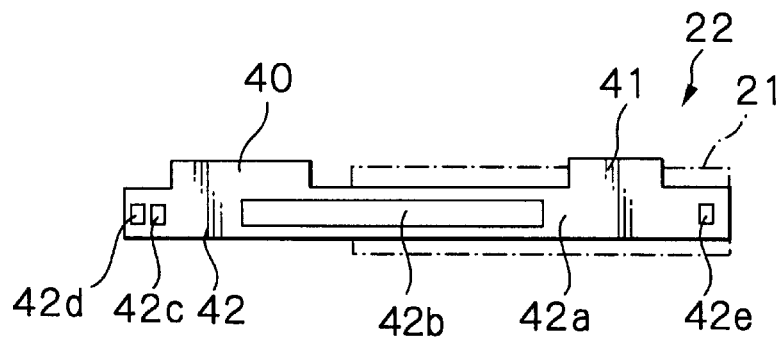
FIG. 5 is a side view illustrating the structure of the actuator of FIG. 4.
Figure 6:
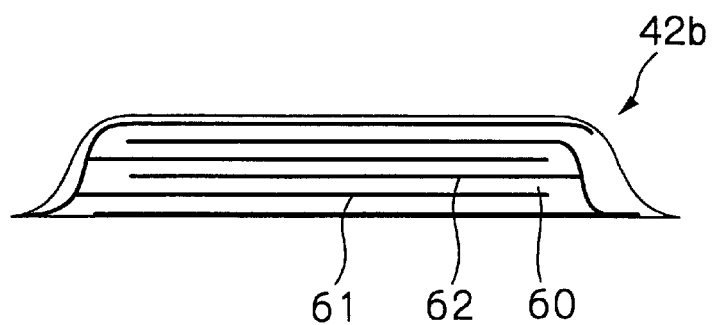
FIG. 6 is a sectional view illustrating a structure of a piezoelectric element section of the actuator shown in FIGS. 4 and 5.
Figure 7:
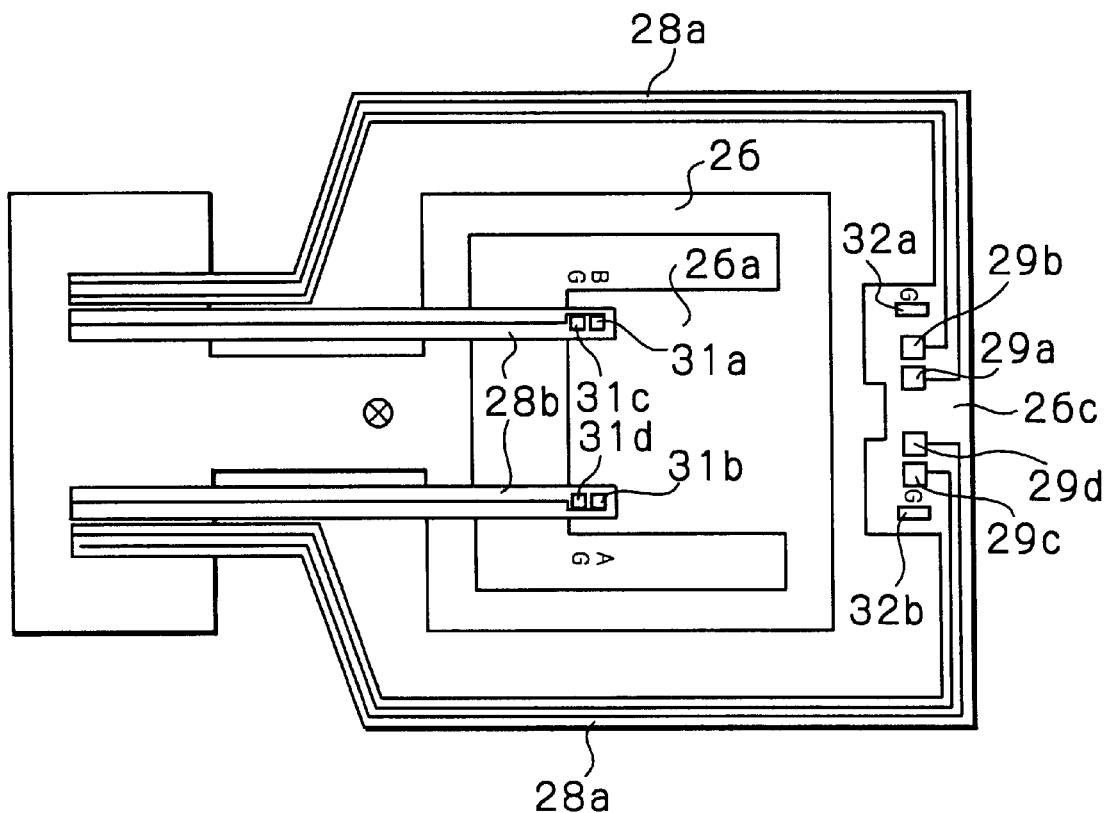
FIG. 7 is a plane view schematically illustrating a conductor member formed on a flexure in the embodiment of FIG. 1.
Figure 8:
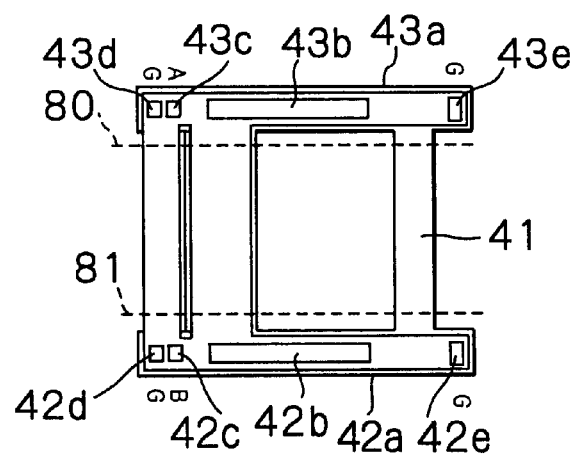
FIG. 8 is a plane view schematically illustrating a conductor member formed on the actuator in the embodiment of FIG. 1.

FIGS. 4 and 5 illustrate a structure of the actuator 22 in the embodiment of FIG. 1, FIG. 6 illustrates a structure of a piezoelectric element section of the actuator 22, FIG. 7 schematically illustrates a conductor member formed on the flexure in this embodiment, and FIG. 8 schematically illustrates a conductor member formed on the actuator in this embodiment.

FIGS. 4 and 5 are indicated by turning the actuator shown in FIGS. 2 and 3 upside down and thus the upper surface of a base section of the actuator will be fixed to the suspension. Since FIG. 7 is schematic figure, the flexure is depicted in somewhat different shape from that shown in other figures. FIG. 8 indicates a flat state actuator before bending. The actuator is formed in fact by outwardly bending its parts along the broken lines 80 and 81.

As will be noted from FIGS. 4, 5 and 8, the main portion (frame) of the actuator 22 in this embodiment is formed by cutting out a single metal plate member in a ladder shape, and by bending it into three dimensional shape. Namely, each actuator member cut out in a ladder shape is substantially perpendicularly bent along lines inside from the both side edges of a strip-shaped base section 40, upper surface of which will be fixed to the suspension, and of a strip-shaped coupling section 41, lower surface of which will be fixed to the magnetic head slider. Thus, a pair of movable arms 42 and 43 of the actuator run in parallel with each other keeping substantially perpendicular to the base section 40 and the coupling section 41. Since the actuator is formed by bending at inside positions from the side end edges of the coupling section 41, each of the movable arms 42 and 43 is shaped in a strip-shaped plane plate. In order to obtain large stroke in response to a lower driving force, it is very important that the whole of each movable arm is formed in a plane plate shape.

In this embodiment, the base section 40 couples the movable arms 42 and 43 at a slightly inward position from the rear end of the movable arms. These movable arms 42 and 43 are formed in parallel to side surfaces of the magnetic head slider 21, and the base section 40 and the coupling section 41 are formed in parallel to a surface which is opposite to the ABS of the magnetic head slider 21.

The movable arms 42 and 43 consist of arm members 42a and 43a (FIG. 8), piezoelectric elements 42b and 43b (FIG. 8) formed on outside surfaces of the arm members 42a and 43a, respectively, the signal terminals 42c and 43c (FIG. 8) of the piezoelectric elements 42b and 43b, and ground terminals 42d, 43d, 42e and 43e (FIG. 8). The ground terminals 42d, 43d, 42e and 43e are directly connected to the metal plate member of the actuator. In this embodiment, the piezoelectric elements, the signal terminals and the ground terminals are formed on the outside surfaces of the arm members. However, it is possible to form them on the inside surfaces of the arm members. The latter is preferable because a region for catching the actuator by a jig will increase.

The base section 40, the coupling section 41 and the arm members 42a and 43a are united by cutting and bending a single resilient metal plate such as a stainless steel plate for example. As for the metal plate, a resilient plate spring material such as a carbon steel plate, a copper alloy plate (for example a copper titanium plate, a phosphor bronze plate or a beryllium copper plate), or a titanium plate may be used other than an alloy steel plate such as the stainless steel plate. In case that the piezoelectric elements are formed by printing and sintering, a good heat resistance material should be used as the metal plate.

Each of the piezoelectric elements 42b and 43b has, as shown in FIG. 6, a multi-layered structure of alternately laminating piezoelectric material layers 60, signal electrode layers 61 and ground (common) electrode layers 62. By applying voltage across the signal electrode layers 61 and the ground (common) layers 62, the piezoelectric material layers 60 expand and contract. The piezoelectric material layer 60 is made of material that expands and contracts by reverse piezoelectric effect or by electrostrictive effect. The signal electrode layers 61 are electrically connected to the B channel signal terminal 42c or the A channel signal terminal 43c, and the ground electrode layers 62 are electrically connected to the ground terminal 42d and 42e or the ground terminal 43d and 43e.

In case that the layers 60 are made of piezoelectric material such as PZT (Lead Zirconate Titanate Oxidization), these piezoelectric material layers are in general polarized so as to improve their displacement performance. The polarized direction is the lamination direction of the piezoelectric material layers 60. When voltage is applied across the electrode layers and the direction of the produced electrical field is the same as the polarized direction, the piezoelectric material layer between the electrode layers expands in its lamination direction (piezoelectric longitudinal effect) and contracts in its in-plane direction (piezoelectric lateral effect). Contrary to this, when the direction of the produced electrical field is in inverse as the polarized direction, the piezoelectric material layer between the electrode layers contracts in its lamination direction (piezoelectric longitudinal effect) and expands in its in-plane direction (piezoelectric lateral effect).

If the voltage with a polarity which will induce the contraction or expansion is applied to the piezoelectric element 42b or 43b, the piezoelectric element contracts or expands in response to the applied voltage polarity and thus the movable arm 42 or 43 bends to trace a S-character resulting the top end section of the arm 42 or 43 to laterally and linearly displace. Thus, the magnetic head slider 21 fixed with the actuator 22 also laterally and linearly displaces. Since the slider displaces namely oscillates with linear motion not swinging or rotational motion, more precise positioning of the magnetic head element can be expected.

It is possible to apply voltages that induce mutually reverse motions may be simultaneously applied to the piezoelectric elements 42b and 43b, respectively. In other words, AC voltages may be simultaneously applied to the piezoelectric elements 42b and 43b so that one piezoelectric element expands when the other piezoelectric element contracts and vice versa. The oscillation of the movable arms is centered when no voltage is applied to the piezoelectric elements.

However, one of the piezoelectric elements is expanded and therefore the direction of the driving voltage opposes to that of the polarization in the piezoelectric material layer. Thus, if the applied voltage is high or the voltage is continuously applied, attenuation in polarization of the piezoelectric material layer may occur. It is desired therefore that a constant DC bias voltage in the same direction as the polarization direction be additionally applied to the AC voltage to form the driving voltage so that the direction of the driving voltage never opposes to that of the polarization in the piezoelectric material layer. The oscillation of the movable arms is centered when only the bias voltage is applied to the piezoelectric elements.

In this specification, the piezoelectric material is material that expands or contracts by their reverse piezoelectric effect or electrostrictive effect. Any piezoelectric material applicable for the piezoelectric elements of the actuator can be used. However, for high rigidity, it is desired to use a ceramics piezoelectric material such as PZT[Pb(Zr,Ti)O$_3$], PT(PbTiO$_3$), PLZT[(Pb,La)(Zr,Ti)O$_3$], or barium titanate (BaTiO$_3$).

Each of the piezoelectric elements may have a single layer structure of alternately laminating a piezoelectric material layer, a signal electrode layer and a ground (common) electrode layer.

As aforementioned, the actuator 22 in this embodiment holds the magnetic head slider 21 by adhering its coupling section 41 to the surface opposite to the ABS of the slider 21 using a resin adhesive for example. Since the magnetic head slider 21 is fixed to the coupling section 41, fixing of the slider can be achieved with sufficient strength and a shock resistance against up-and-down movements can be greatly improved. Also, magnetic head sliders with different widths can be easily mounted to the actuator.

Because of a partial fixing of the magnetic head slider 21 to the coupling section 41 of the actuator 22, shape change in the ABS of the magnetic head slider 21 (generation of crown or camber) can be prevented from occurring even if the adhesive deforms due to change in atmosphere temperature. The fixing strength can be increased if the adhesive is also applied to the side surfaces of the magnetic head slider 21. In case of using a conductive adhesive, the body of the magnetic head slider 21 can be easily grounded through the actuator 22.

The actuator 22 in this t is fixed to the suspension by adhering its base section 40 to the tongue 26a of the flexure 26 using an adhesive.

Via holes 40a and 41a respectively formed through the base section 40 and the coupling section 41 are utilized such that, when a UV (ultra violet) curing resin adhesive is used for fixing, a UV light for curing can be directly radiated to the adhesive. Also, these via holes 40a and 41a may be utilized for positioning the actuator when fixing because coordinates of the actuator will be defined by a line between the centers of these via holes.

The height of the actuator 22 should be determined to be equal to or less than that of the magnetic head slider 22 so that the total height of the HGA will not increase even if the actuator is assembled in the HGA. In other words, the height of the actuator 22 can be increased to that of the magnetic head slider 22 so as to improve the strength of the actuator itself without increasing the total HGA height.

As aforementioned, since the base section 50, the coupling section 41 and main portions of the movable arms 42 and 43 of the actuator 22 in this embodiment are made from a metal plate, the weight of the whole actuator can be reduced and thus a mechanical resonance frequency of the actuator can be increased.

Also, as the basic member is formed by the metal plate that is strong and light-weighted, a shock resistance of the movable arms 42 and 43 which are particularly weaken for the shock can be greatly improved.

Due to the usage of the metal plate provided with a high mechanical strength, treatment of the actuator during assembling of the HGA becomes very easy.

By using the metal plate to form the main portion of the actuator, the flexibility on a design of the actuator will improve with the shape and/or size. Thus, not only it is enabled to design the actuator with a sufficient stroke, but also it is possible to align the center of the magnetic head slider 21 and the load point or dimple position with the center of the actuator 22 resulting the flying performance of the magnetic head slider 21 to be extremely stabilized. Because the metal plate can be precisely machined, accuracy in size of the actuator 22 itself can be greatly improved.

Furthermore, since the actuator 22 in this embodiment holds the magnetic head slider 21 such that the slider 21 is mounted in a space between the movable arms 42 and 43, the thickness of the HGA around the magnetic head slider does not increase even if the actuator 22 is attached. Thus, no modifications in size of the magnetic disk drive apparatus due to the mounting of the actuator is necessary.

In addition, since the magnetic head slider 21 is caught in between the movable arms 42 and 43, the top end sections of the movable arms 42 and 43, which actually transfer the displacement to the slider 21, can be extended to always position at the top end of the slider 21. Thus, it is possible to provide a constant travel to the slider even if the size of the magnetic head slider 21 changes, and therefore an enough stroke of the magnetic head at the precise positioning operation can be always obtained.

Figure 9:
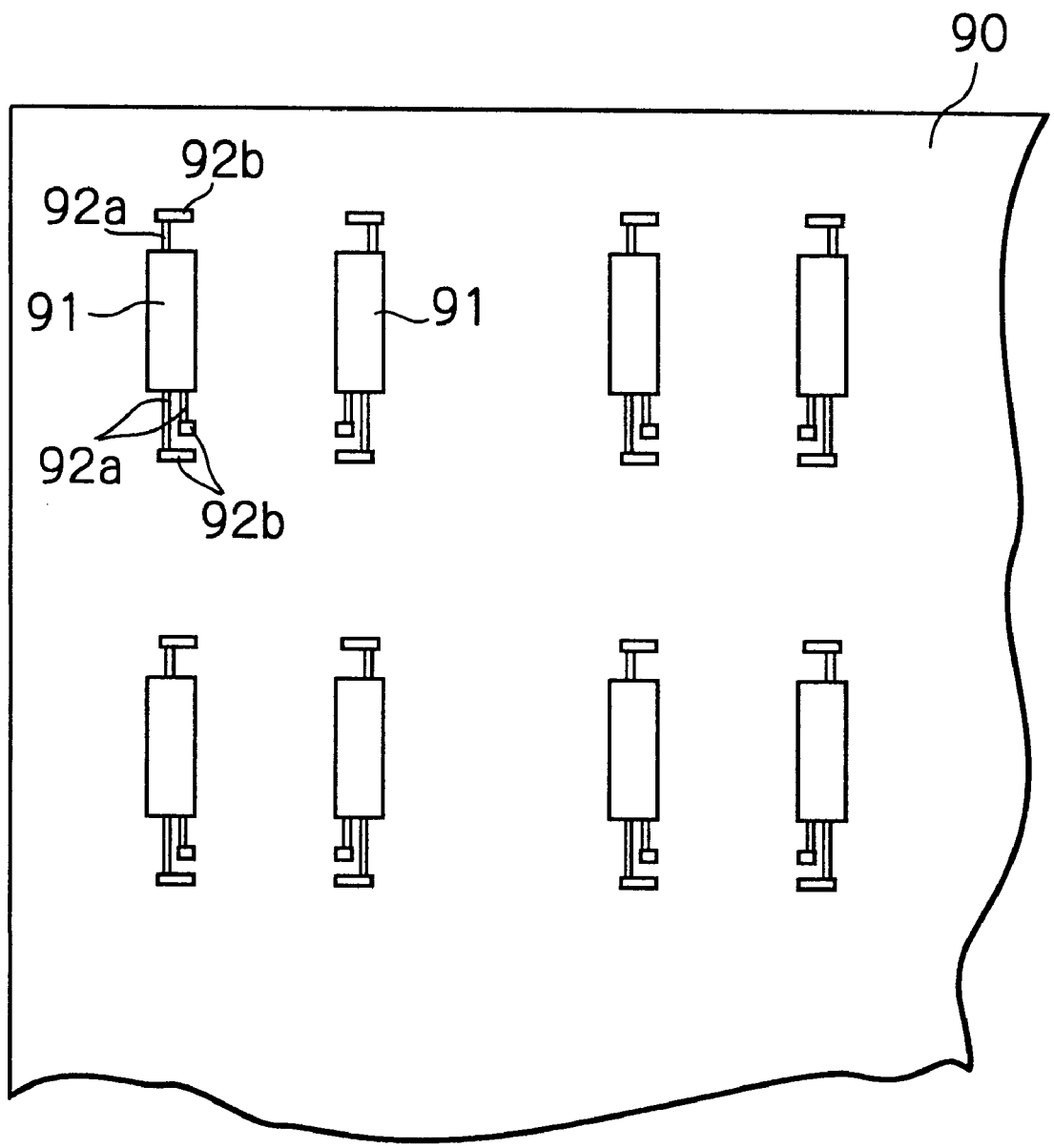
FIG. 9 is a plane view illustrating a part of a manufacturing process of the actuator in the embodiment of FIG. 1.
Figure 10:
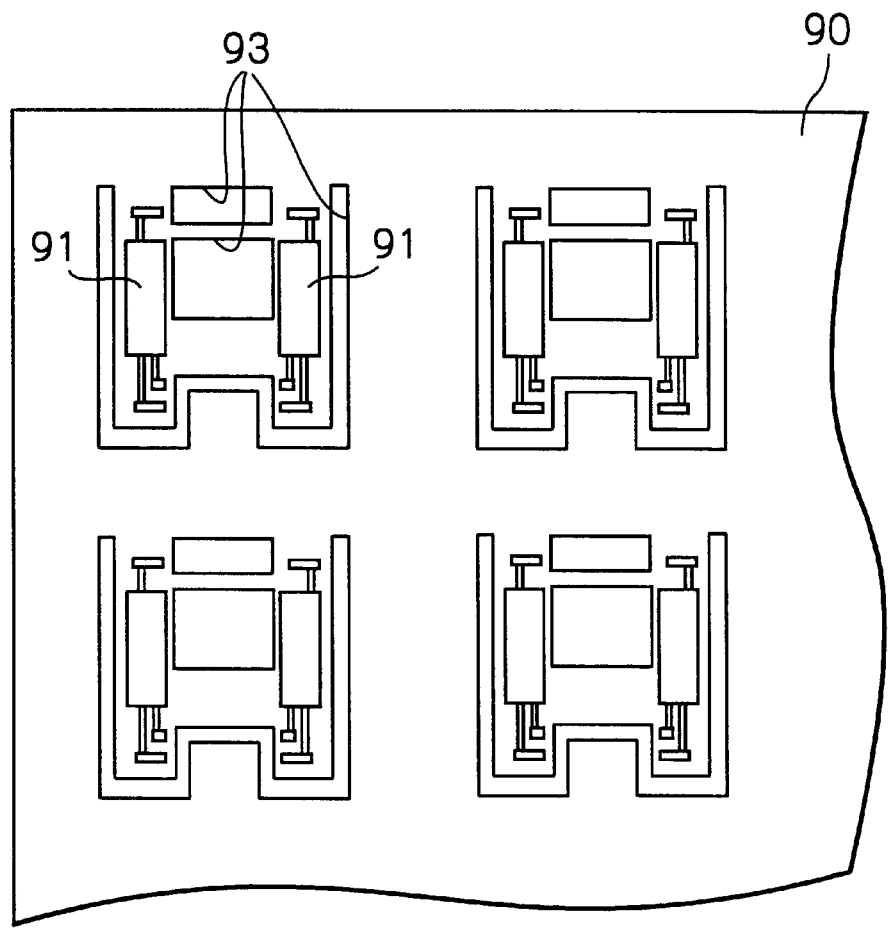
FIG. 10 is a plane view illustrating a part of a manufacturing process of the actuator in the embodiment of FIG. 1.
Figure 11:
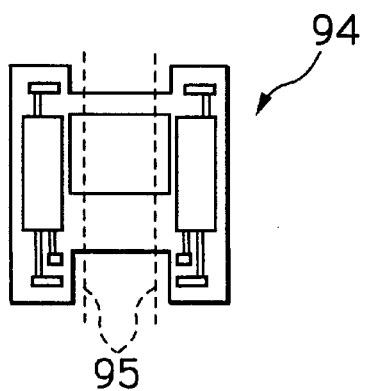
FIG. 11 is a plane view illustrating a part of a manufacturing process of the actuator in the embodiment of FIG. 1.

FIGS. 9 to 11 illustrate parts of a manufacturing process of the actuator in this embodiment. Hereinafter, the manufacturing process of the actuator will be described with reference to these figures.

First, as shown in FIG. 9, many of regions for actuators are set in matrix on a resilient metal plate 90 such as a stainless plate, and then a multi-layered structure of piezoelectric elements 91 and conductor patterns consisting of lead conductors 92a electrically connected with the piezoelectric elements 91 and terminal electrodes 92b is formed in each region by sputtering and photolithography. More concretely, in each region, a PZT layer is deposited by sputtering over the whole surface of the metal plate, the deposited PZT layer is patterned by photolithography, a conductor layer is deposited by sputtering over the whole surface, and then the conductor layer is patterned by photolithography to form the conductor patterns consisting of the lead conductors 92a and the terminal electrodes 92b. Thereafter, these processes are repeatedly executed to form the multi-layered structure of the piezoelectric element and the conductor patterns. The conductor patterns consisting of the lead conductors 92a and the terminal electrodes 92b are formed by a patterned Cu layer on an insulation layer of resin material such as polyimide. Within the areas of the terminal electrodes 92b, an Au layer is additionally laminated on the Cu layer.

The PZT layer of the piezoelectric element 91 may be formed on the metal palter 90 by using a gas deposition method in which ultra fine particles are impacted at high speed other than by using the above-mentioned thin-film method such as sputtering. This gas deposition method utilizes fast deposition due to high speed impact of an ultrafine particle beam and deposits at a high speed PZT ultrafine particles with a relatively low surface activity, formed by a mechanical crushing method, on a metal plate (J. Akedo, "Deposition method using an ultrafine particle beam and its application to microfabrication", Jpn. Appl. Phys. Vol.68, No.1, 1999, pp.44–47). According to this gas-deposition method, a thick-film of PZT can be deposited on a metal plate in a low process temperature.

In a modification, piezoelectric elements 91, and a conductor patterns 92 consisting of lead conductors 92a electrically connected with the piezoelectric elements 91 and terminal electrodes 92b may be formed by printing, then this printing process be repeatedly executed to form a multi-layered structure and thereafter the formed multi-layered structure be sintered.

In another modification, piezoelectric elements 91 individually formed may be adhered on a metal plate 90 and electrically connected with conductor patterns preliminarily formed on the metal plate 90.

Next, as shown in FIG. 10, on the metal plate 90, grooves and openings 93 for cutting the plate are formed by etching along each partition between the regions for actuators. Then, this metal plate 90 is cut along the grooves 93 and thus, as shown in FIG. 11, individually separated actuator members 94 each having a ladder-plane shape are obtained.

Thereafter, each actuator member 94 is bent along broken lines 95 and thus the actuator 22 with a three-dimensional structure shown in FIG. 4 is formed.

In a modification, each actuator member 94 may be cut from the metal plate 90 by press working instead of etching. In this case, bending of the member can be simultaneously performed.

In another modification, the bending of the actuator members may be performed before cutting of the actuator members from the metal plate.

In a further modification, piezoelectric elements 91 individually formed may be adhered on an actuator member 94 cut from the metal plate 90 or on an actuator member 94 after bending, and electrically connected with conductor patterns preliminarily formed on the actuator member 94.

In order to assemble an HGA using this actuator, first, an adhesive such as a thermosetting epoxy resin family adhesive or a UV resin family adhesive is coated on a part of a surface opposite to the ABS of the magnetic head slider 21. Then, the actuator 22 is disposed on the slider 21 such that the coupling section 41 of the actuator 22 contacts to the adhesive coated part of the slider 21 and pressed to the slider 21. The actuator and the slider are kept at this state until the adhesive is cured. An assembly of the magnetic head slider 21 and the actuator 22 is thus formed.

Since assembling of the magnetic head slider 21 and the actuator 22 can be carried out on the flat plate, alignment of the slider and the actuator becomes easy resulting that a higher accuracy assembling can be expected.

Then, the assembly of the magnetic head slider 21 and the actuator 22 is fixed on the flexure 26 of the suspension 20 as shown g in FIG. 3. More concretely, adhesive is coated on the insulation layer on the tongue 26a of the flexure 26 and on the separated section 26c of the flexure 26, respectively, and the base section 22a (40) of the actuator 22 of the assembly and the top end section of the magnetic head slider 21 of the assembly are adhered on the insulation layer and on the separated section 26c, respectively. It is desired that the fixing between the top end section of the magnetic head slider 21 and the separated section 26c is achieved by means of a conductive adhesive.

In this embodiment, because the actuator 22 is mainly made from a metal plate, the assemble may be directly fixed with the flexure 26 without using adhesive by laser welding the base section 22a (40) of the actuator 22 with the tongue 26a of the flexure 22.

Then, the B channel signal terminal 42c and the A channel signal terminal 43c of the actuator 22 are electrically connected with the actuator connection pads 31a and 31b by soldering or using silver containing epoxy resin, respectively. If the soldering is used for the connection, connection strength of the assembly with the suspension will increase.

Thereafter, the terminals electrodes 21a–21d of the magnetic head slider 21 are electrically connected to the head element connection pads 29a–29d by Au ball-bonding for example, respectively.

Since the assembly has a simple shape, the above-mentioned processes of fixing by means of adhesion or laser welding and electrical connection of the assembly with the suspension can be performed by using a general HGA assembling equipment resulting the productivity to extremely improve and thus the manufacturing cost to reduce.

The assembling of an HGA may be performed by fixing first an actuator to a suspension, and then by fixing a head slider provided with at least one head element to the coupling section of the actuator to mount the slider on the actuator already fixed with the suspension.

Figure 12:
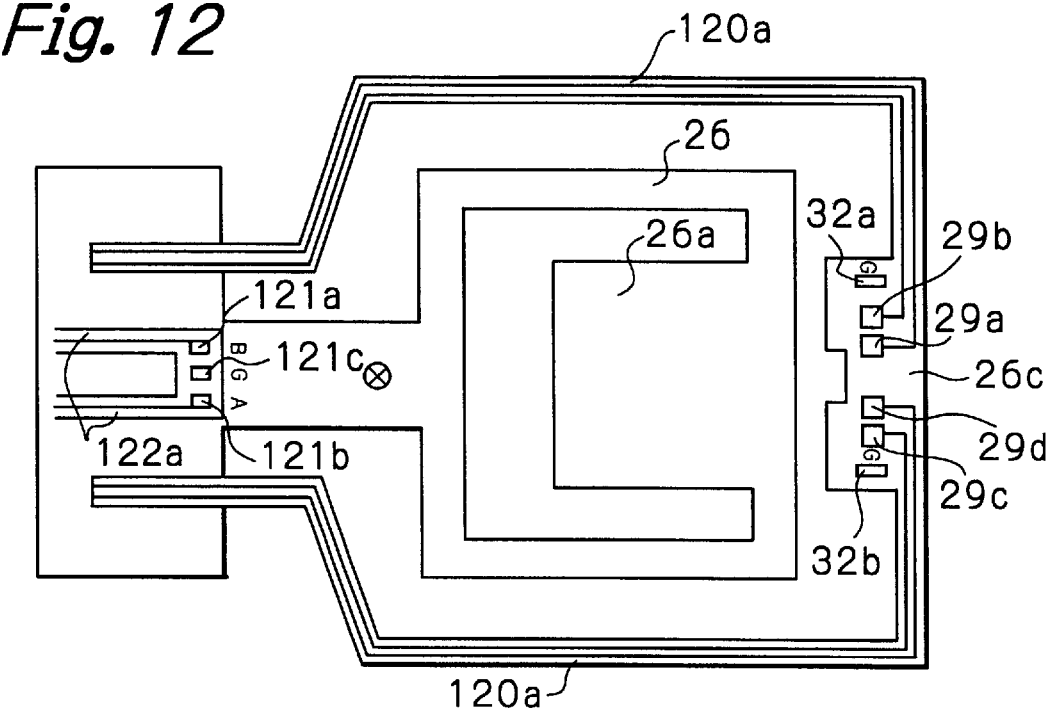
FIG. 12 is a plane view schematically illustrating a conductor m formed on a flexure in a modification of the embodiment of FIG. 1.
Figure 13:
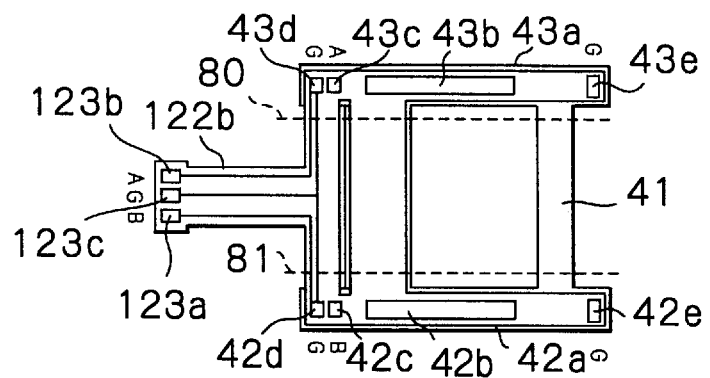
FIG. 13 is a plane view schematically illustrating an example of a conductor sheet attached on an actuator in the modification of FIG. 12.
Figure 14:
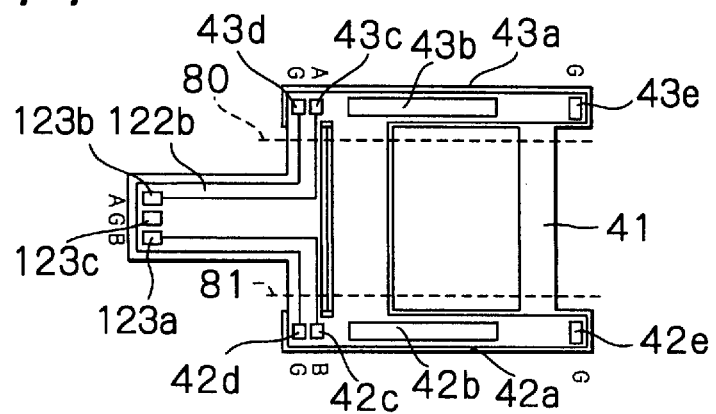
FIG. 14 is a plane view schematically illustrating another example of a conductor sheet attached on an actuator in the modification of FIG. 12.
Figure 15:
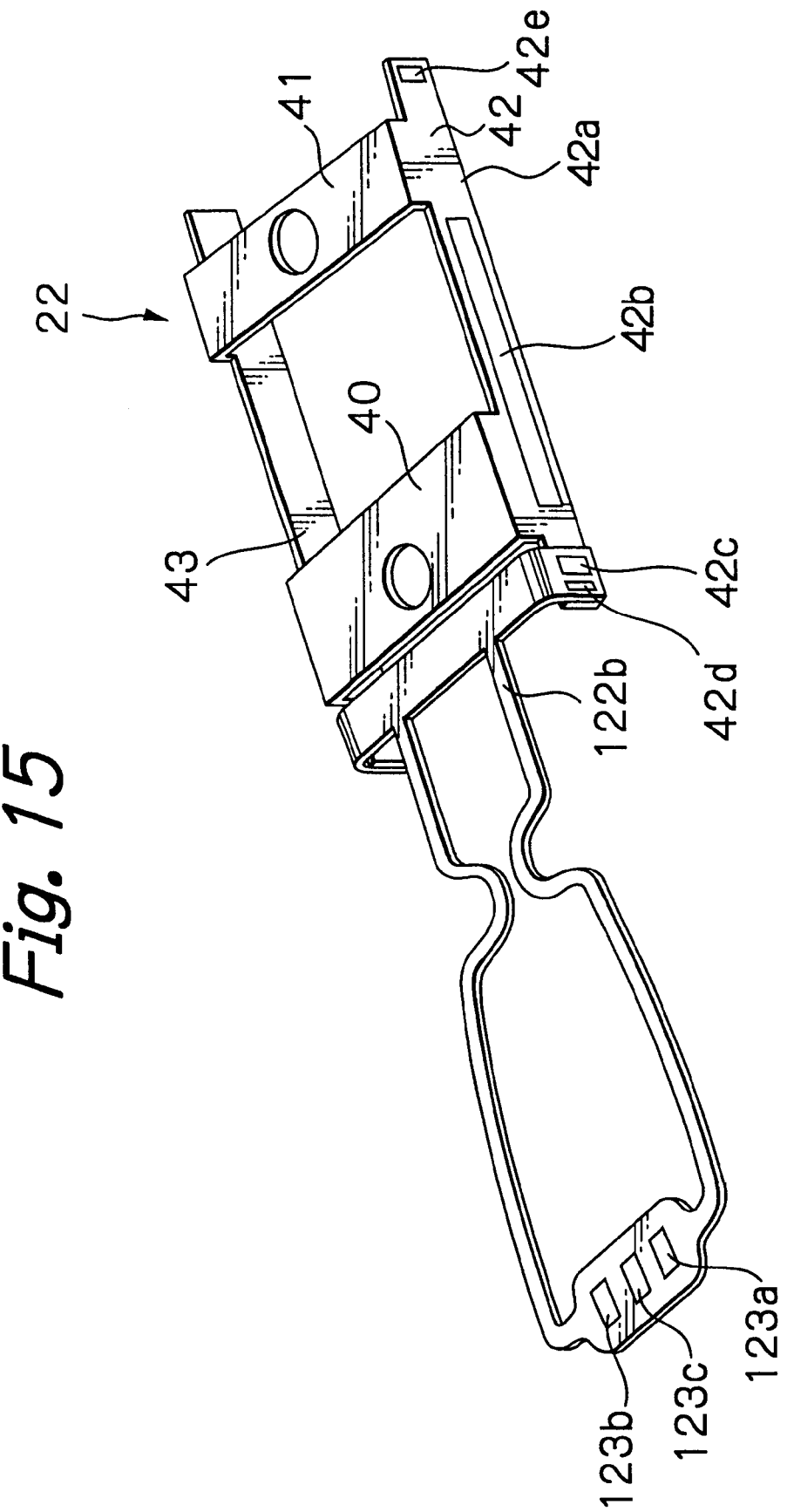
FIG. 15 is an oblique view illustrating an actuator with the conductor sheet.
Figure 16:
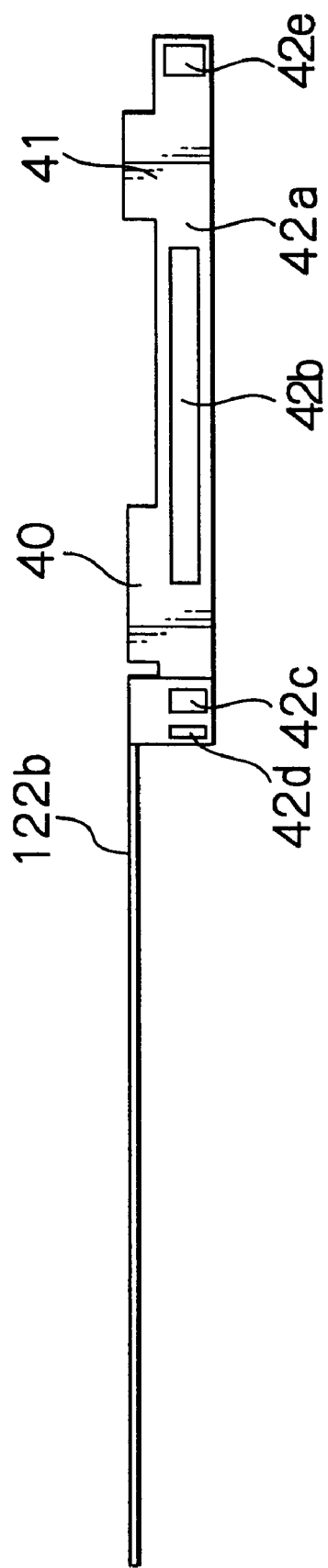
FIG. 16 is a side view illustrating the actuator of FIG. 15.

FIG. 12 schematically illustrates a conductor member formed on a flexure in a modification of the embodiment of FIG. 1, FIGS. 13 and 14 schematically illustrate examples of a conductor sheet attached on an actuator in the modification of FIG. 12, FIG. 15 illustrates an actuator with a conductor sheet, and FIG. 16 is a side view of the actuator of FIG. 15. The examples shown in FIGS. 13 and 14 somewhat differ from each other in the configurations of the conductor sheets but the other configurations are the same.

In this modification, a second conductor member to be connected to the actuator 22 are not extended to the tongue 26a of the flexure 26 but terminated at a midpoint of the flexure 26. The terminated end of trace conductors of the second conductor member are interconnected with trace conductors of a conductor m formed on the actuator 22.

In FIGS. 12 to 15 of this modification, the similar elements as those in the embodiment of FIG. 1 are represented by the same reference numerals.

As will be noted from FIG. 12, the configuration of a first conductor m 120a in this modification is quite the same as that of the first conductor member 28a in the embodiment of FIG. 1. The second conductor member in this modification consists of a first section 122a including two trace conductors one end of which are electrically connected to actuator connection pads 121a and 121b formed before the tongue 26a of the flexure 26, and a second section 122b formed on the actuator 22. The first section 122a of the second conductor mer has no ground trace conductor and thus ground connection pad 121c is directly connected to the flexure 26 so as to be grounded to the drive arm 16 through the second load beam 24, the hinge 25, the first load beam 23 and the base plate 27.

As shown in FIGS. 13 and 14, on the actuator 22, the second section 122b of the second conductor member, consisting of a conductor sheet of a thin-film multi-layered pattern is formed or disposed. This conductor sheet 122b includes three trace conductors to be electrically connected to actuator connection pads 121a and 121b and to a ground pad 121c formed in the first section 122a. The conductor sheet 122b is formed by sequentially depositing a first insulation material layer made of a resin such as polyimide with a thickness of about 5 $\mu$m, a patterned Cu layer (trace conductor layer) with a thickness of about 4 $\mu$m, and a second insulation material layer made of a resin such as polyimide with a thickness of about 5 $\mu$m in this order. On the conductor sheet 122b, signal connection pads 123a and 123b and a ground pad 123c electrically connected to one ends of the trace conductors are formed. These signal connection pads 123a and 123b and ground pad 123c are to be connected to the actuator connection pads 121a and 121b and to the ground pad 121c formed in the first section 122a, respectively. The other ends of the trace conductors of the conductor sheet 122b are electrically connected to the B channel and A channel signal terminals 42c and 43c and the ground terminals 42d and 43d formed on the movable arms 42 and 43 of the actuator 22, respectively.

The conductor sheet 122b is formed on a metal plate for the actuator before bending it. When bending the metal plate, the conductor sheet 122b will follow without receiving unnecessary stress. The movable arms 42 and 43 extend backward from the base section 40, and the conductor sheet 112b and terminals are formed on the side surface of the extended movable arms. Thus, when the actuator is formed by bending the metal plate, the stress applied to the trace conductors on the conductor sheet 122b can be reduced causing no damage to the conductor sheet 122b.

Other configurations, operations, and advantages in the aforementioned modifications are the same as those in the embodiment of FIG. 1.

Figure 17:
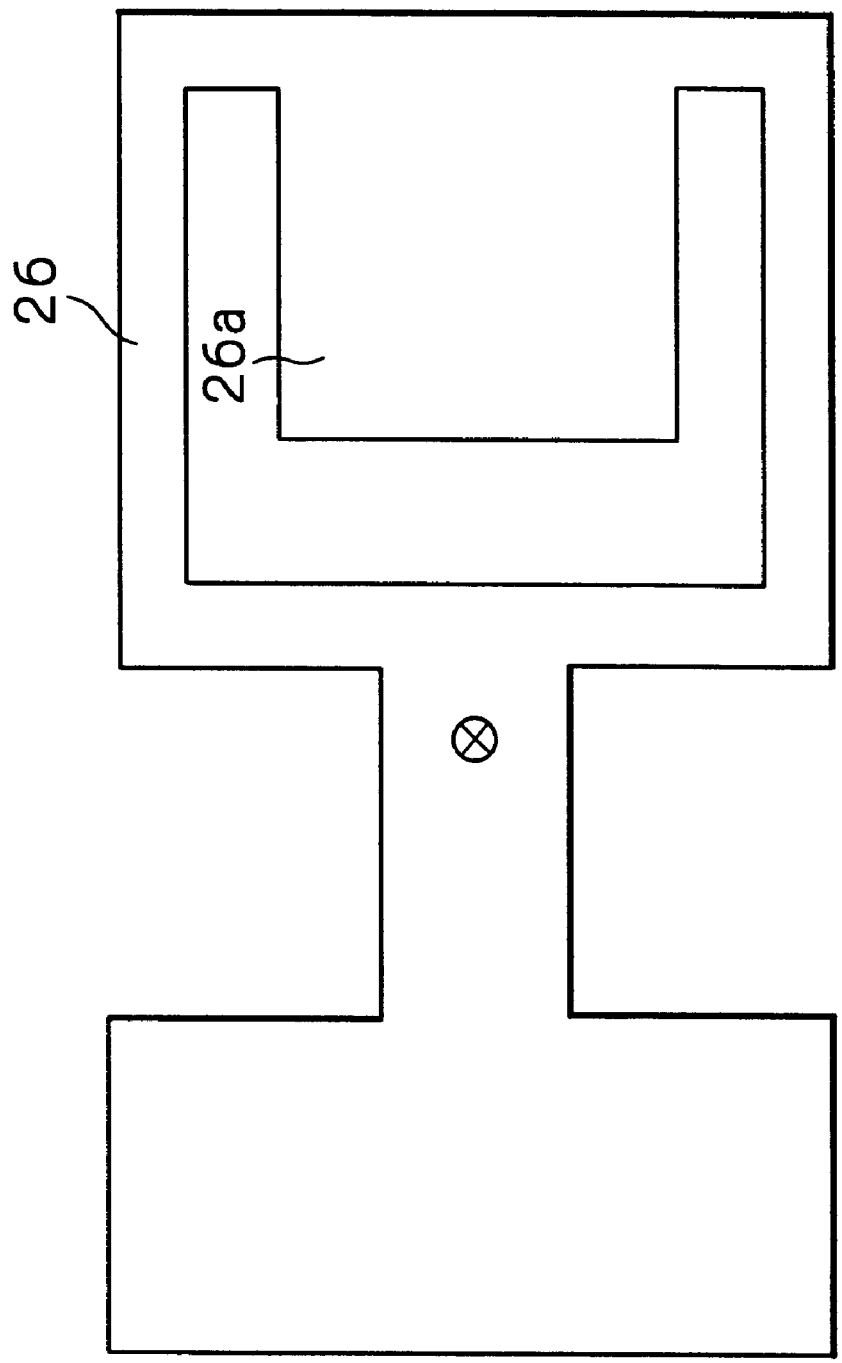
FIG. 17 is a plane view schematically illustrating a conductor m formed on a flexure in another modification of the embodiment of FIG. 1.

FIG. 17 schematically illustrates a conductor member formed on a flexure in another modification of the embodiment of FIG. 1, and FIGS. 18a and 18b schematically illustrate a conductor sheet attached on an actuator in this modification. FIG. 18a indicates a front surface of the actuator fixed to the flexure, and FIG. 18b indicates a rear surface of the actuator fixed to the magnetic head slider.

In this modification, a part of a first conductor member 170a is formed by adhering a conductor sheet on the rear surface of the actuator, and a part of a second conductor member 170b is formed on the front surface of the actuator. In FIGS. 17, 18a and 18b of this modification, the similar elements as those in the embodiment of FIG. 1 are represented by the same reference numerals.

As will be noted from FIG. 17, no trace is preliminarily formed on the flexure 26 in this modification.

As shown in FIG. 18b, on the rear surface of the actuator, the first conductor member 170a consisting of a conductor sheet of a thin-film multi-layered pattern is formed or disposed. This conductor sheet 170a includes two for each side, thus four trace conductors one ends of which are electrically connected to the head element connection pads 29a–29d formed on the individually separated and freely movable section 26c of the flexure 26. The conductor sheet 170a is formed by sequentially depositing a first insulation material layer made of a resin such as polyimide with a thickness of about 5 $\mu$m, a patterned Cu layer (trace conductor layer) with a thickness of about 4 $\mu$m, and a second insulation material layer made of a resin such as polyimide with a thickness of about 5 $\mu$m in this order.

On the other hand, as shown in FIG. 18a, on the front surface of the actuator, a second section 172b of the second conductor =member 170b of a thin-film multi-layered pattern is formed or disposed. The second section 172b consists of a conductor member, formed on the actuator 22, including three trace conductors one ends of which are electrically connected to actuator connection pads 173a and 173b and to a ground connection pad 173c. The other ends of the trace conductors in the second section 172b are electrically connected to the B channel and A channel signal terminals 42c and 43c and the ground terminals 42d and 43d formed on the movable arms 42 and 43 of the actuator 22, respectively.

As shown in FIG. 18b, at the midpoint of the conductor sheet 170a, interconnection pads 171a, 171b and 171c which are electrically connected to the actuator connection pads 173a and 173b and to the ground connection pad 173c, respectively are formed. One ends of three trace conductors in a first section 172a of the second conductor member 170b are electrically connected to the interconnection pads 171a, 171b and 171c, respectively.

According to this modification, since the first conductor member 170a including the trace conductors connected to the head element connection pads 29a–29d is formed on the movable arms 42 and 43, all the trace conductors connected to the head element and the actuator can be provided by a conductor pattern fabricated in the same process. Therefore, the traces became simple and also the manufacturing cost can be reduced. Furthermore, since the first conductor member 170a is adhered in parallel on the movable arms 42 and 43, the movement direction of the arms 42 and 43 intersect the plane of the member 170a. Thus, not only the resistance against the displacement of the movable arms 42 and 43 will decrease but also the trace conductors in the member 170a will not forcedly bend causing no damage to them.

Other configurations, operations, and advantages in this modification are the same as those in the embodiment of FIG. 1.

Figure 19:
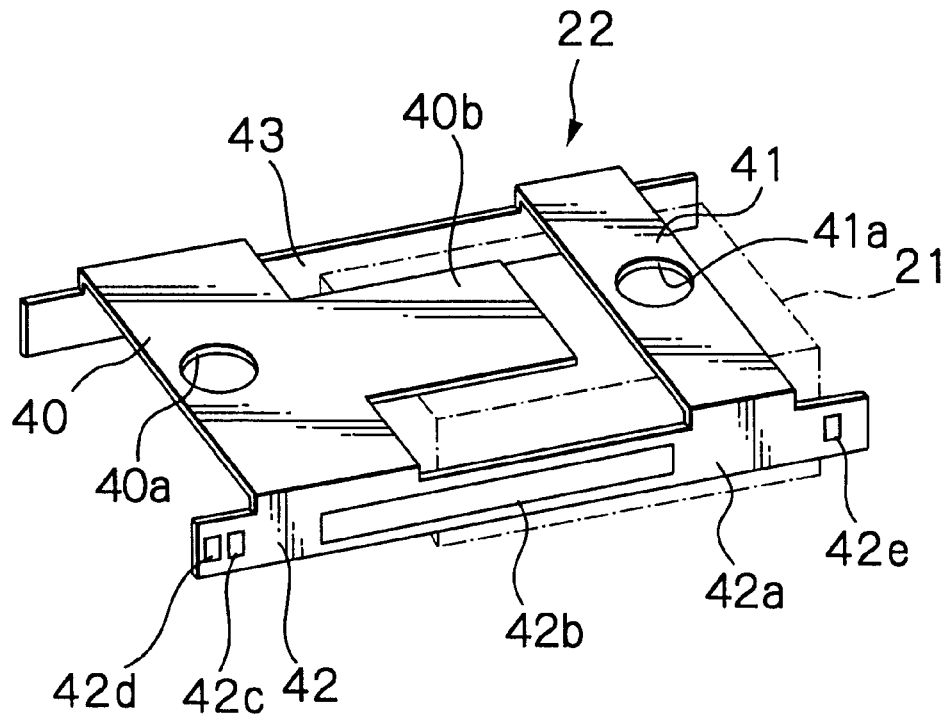
FIG. 19 is an oblique view illustrating a structure of an actuator in another embodiment according to the present invention.
Figure 20:
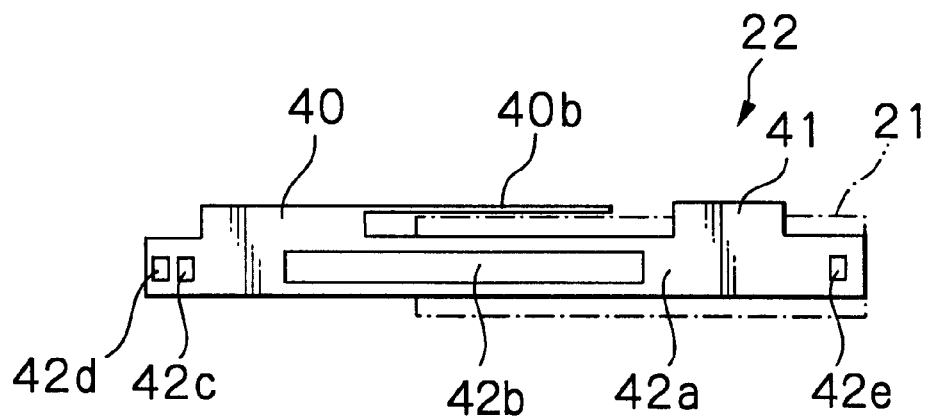
FIG. 20 is a side view illustrating the structure of the actuator of FIG. 19.
Figure 21:
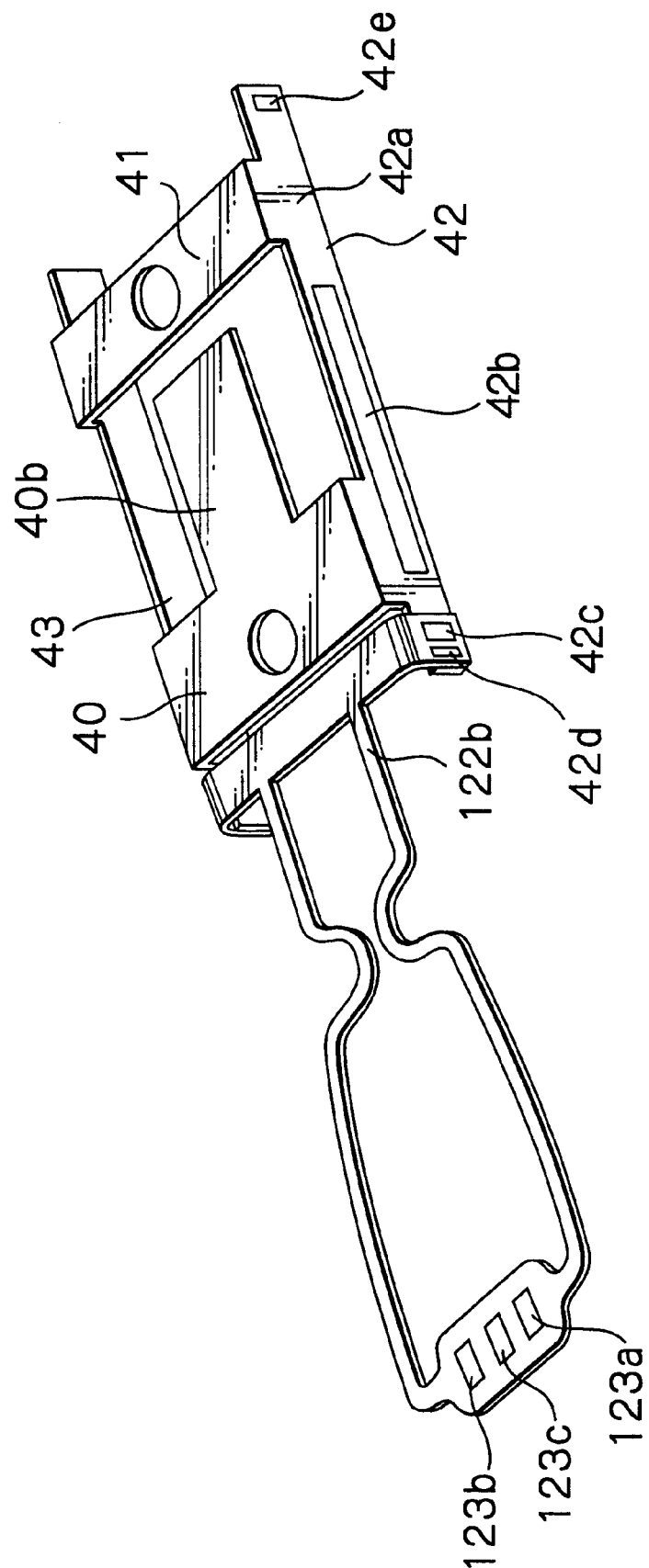
FIG. 21 is an oblique view illustrating the actuator with a conductor sheet in the embodiment of FIG. 19.
Figure 22:
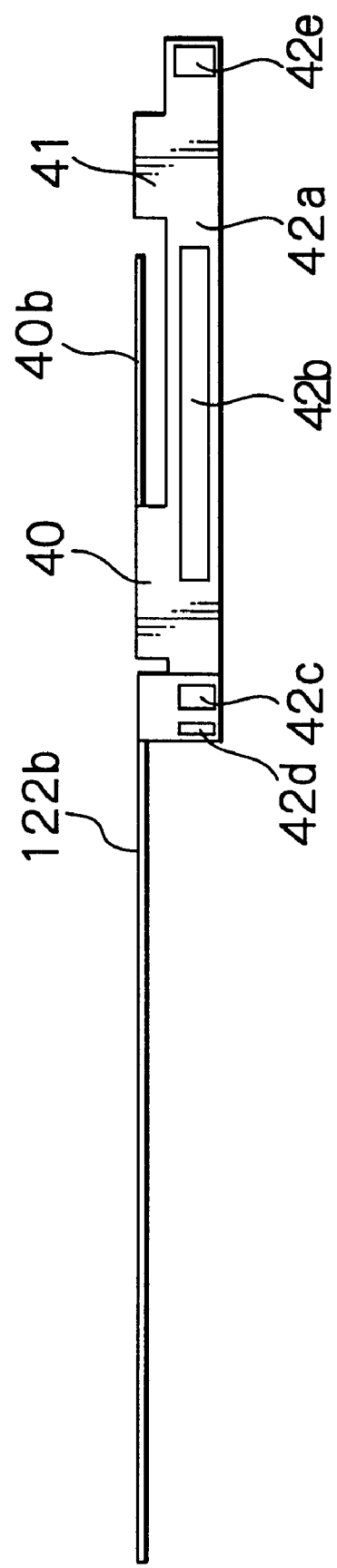
FIG. 22 is a side view illustrating the structure of the actuator and the conductor sheet of FIG. 21.

FIG. 19 illustrates a structure of an actuator in another embodiment according to the present invention, FIG. 20 is a side view of the actuator of FIG. 19, FIG. 21 illustrates the actuator with a conductor sheet in this embodiment, and FIG. 22 is a side view of the actuator of FIG. 21.

FIGS. 19 to 21 are indicated by turning the actuator shown in FIGS. 2 and 3 upside down and thus the upper surface of a base section of the actuator will be fixed to the suspension.

As will be noted from FIGS. 19 to 21, in this embodiment, the base section 40 of the actuator 22 has a shape such that a rectangular projection 40b is protruded frontward from the strip. The area of the base section 40, contributed to adhesion with the tongue 26a of the flexure 26, is enlarged by forming this projection 40b, and thus the fixing strength between the suspension and the actuator can be greatly increased.

Other configurations, operations, advantages and modifications in this embodiment are the same as those in the embodiment of FIG. 1. Also, in FIGS. 19 to 21 of this embodiment, the similar elements as those in the embodiment of FIG. 1 and in its modifications are represented by the same reference numerals.

In this embodiment, it may be necessary to form an air gap between the projection 40b of the actuator 22 and the surface opposite to the ABS of the magnetic head slider 21 to avoid a possible contact of them. FIGS. 23a to 23c and 24a to 24c illustrate a method for effectively form the air gap when the actuator and the slider are adhered to each other.

Figure 23A:
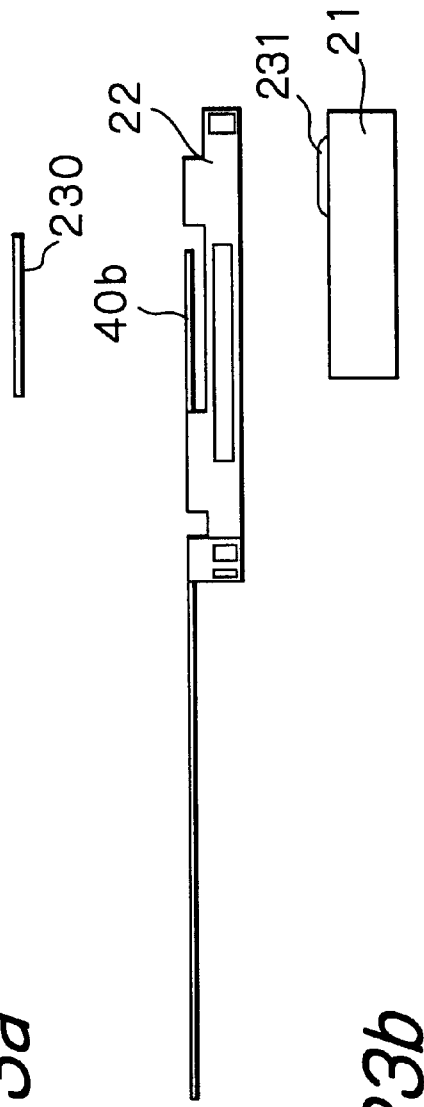
FIGS. 23a to 23c are side views illustrating a method for effectively executing a gap adjustment in the embodiment of FIG. 19.
Figure 23B:
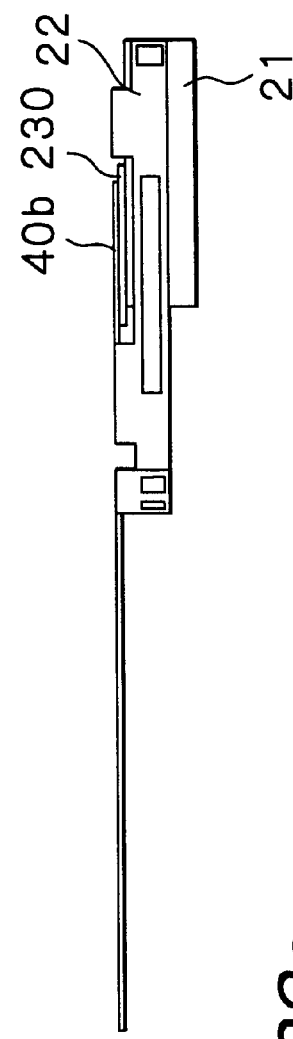
Figure 23C:
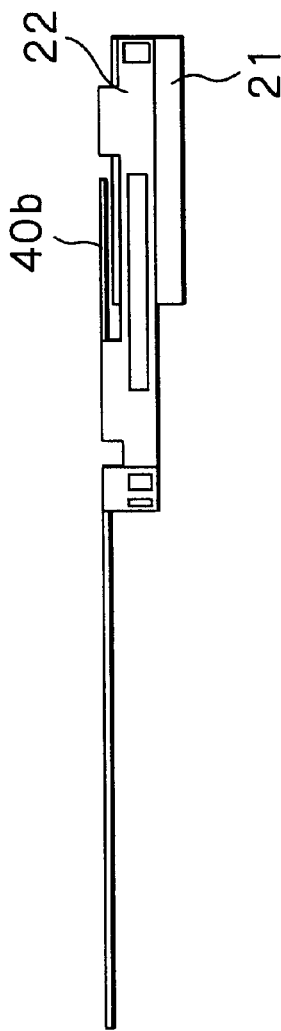
Figure 24A:
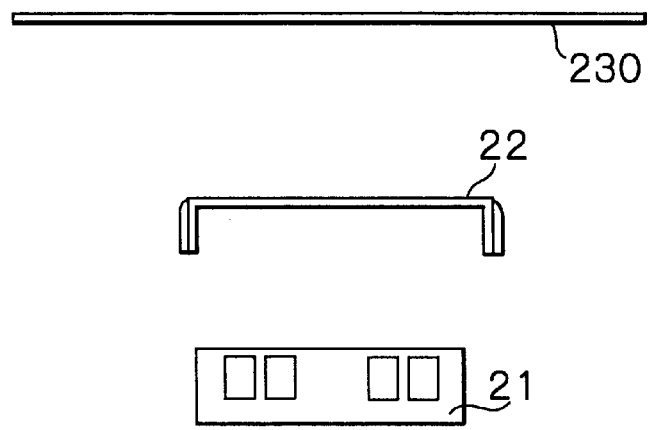
FIGS. 24a to 24c are another side views illustrating the gap adjustment method of FIGS. 23a to 23c.
Figure 24B:
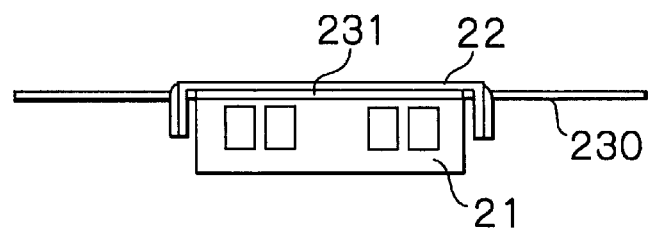
Figure 24C:
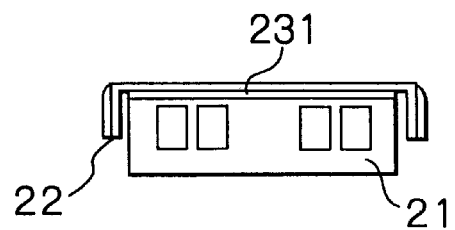

First, a thin polyimide sheet 230 as shown in FIGS. 23a and 24a is prepared. This sheet may have a thickness of about 20–30 μm for example that corresponds to a desired gap distance. A UV resin family adhesive 231 is coated on a fixing portion of the magnetic head slider 21 with respect to the coupling section 41 of the actuator. Then, as shown in FIGS. 23b and 24b, the actuator 22 is disposed on the magnetic head slider 21 under insertion of the sheet 230 between the projection 40b of the actuator 22 and the slider 21 and pressed to the slider 21 with radiating UV light. The actuator and the slider are kept at this state until the UV resin adhesive 231 is cured. Thereafter, by removing the sheet 230, the magnetic head slider 21 and the actuator 22 are fixed to each other with keeping a desired air gap between the projection 40b and the slider 21.

Figure 25:
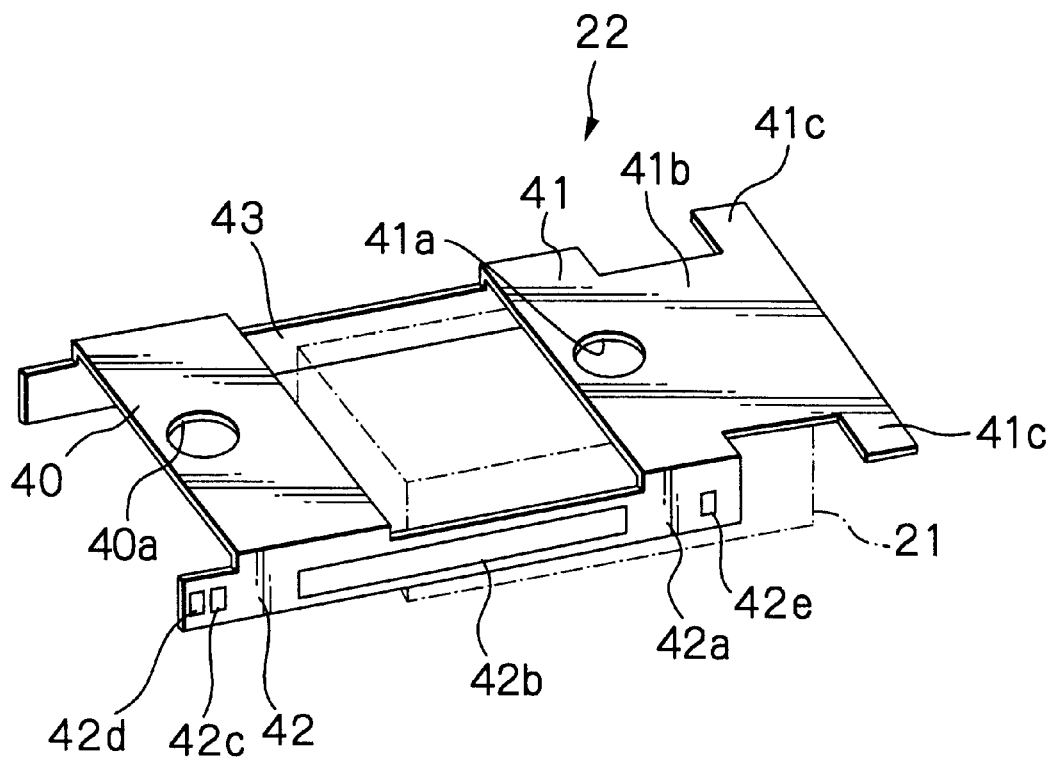
FIG. 25 is an oblique view illustrating a structure of an actuator in a further embodiment according to the present invention.
Figure 26:
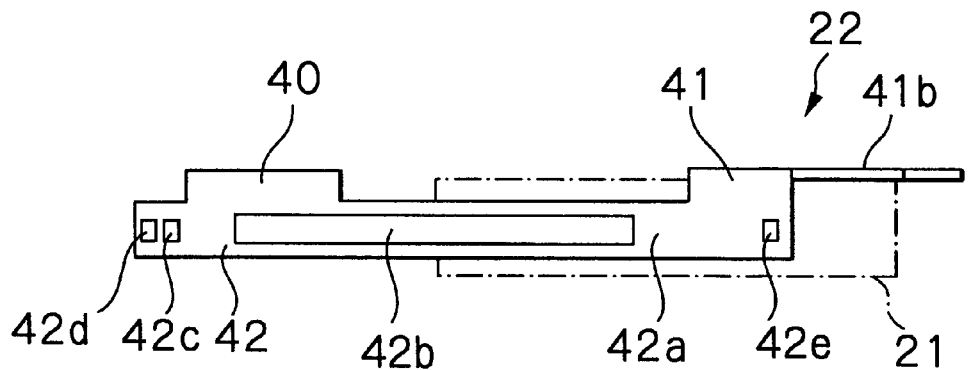
FIG. 26 is a side view illustrating the structure of the actuator of FIG. 25.
Figure 27:
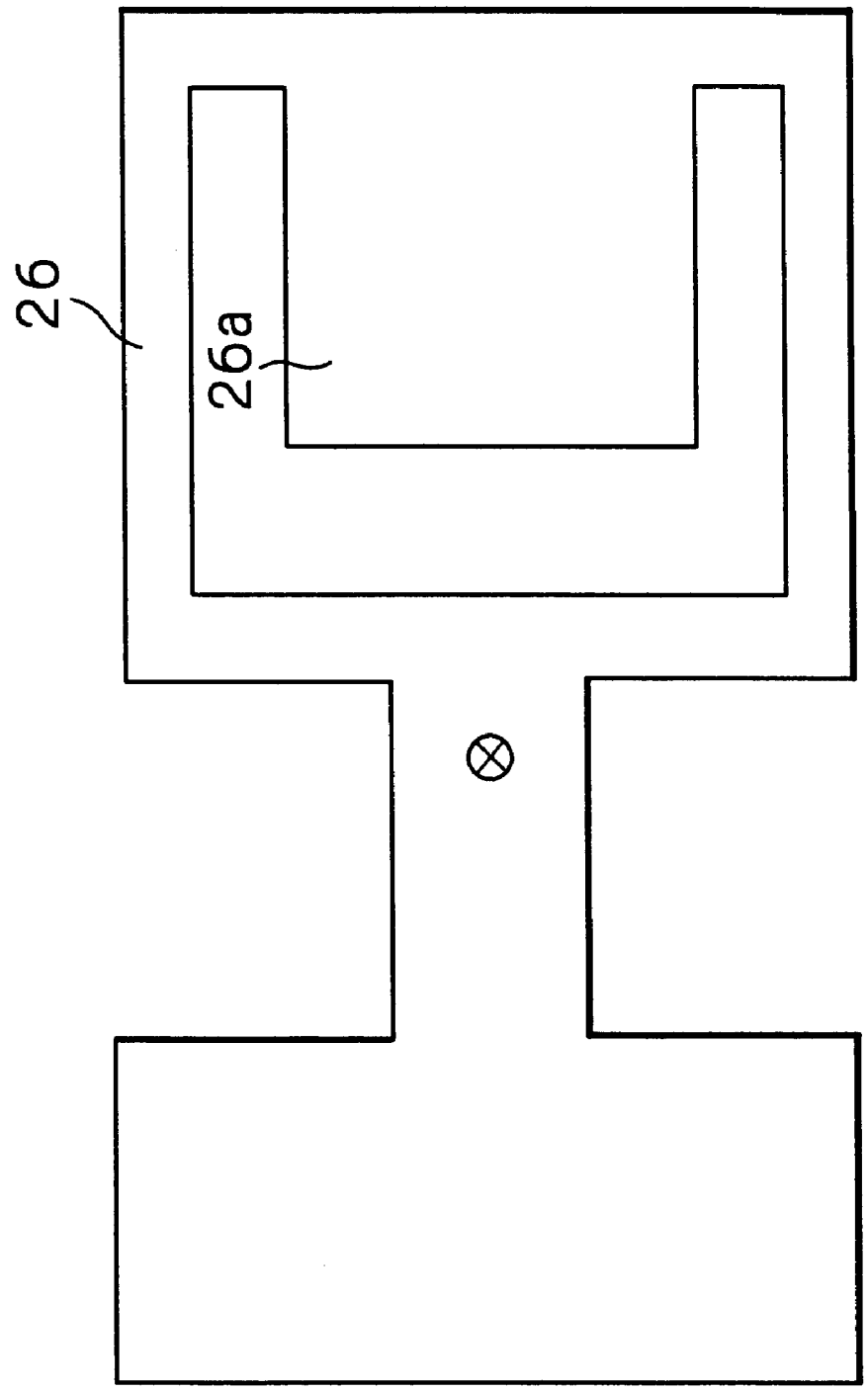
FIG. 27 is a plane view schematically illustrating a conductor member formed on a flexure in the embodiment of FIG. 25.

FIG. 25 illustrates a structure of an actuator in a further embodiment according to the present invention, FIG. 26 is a side view of the actuator of FIG. 25, FIG. 27 schematically illustrates a conductor member formed on a flexure in this embodiment, and FIGS. 28a and 28b schematically illustrate a conductor m formed on the actuator in this embodiment.

FIGS. 25 and 26 are indicated by turning the actuator shown in FIGS. 2 and 3 upside down and thus the upper surface of a base section of the actuator will be fixed to the suspension. FIG. 28a indicates a front surface of the actuator fixed to the flexure, and FIG. 28b indicates a rear surface of the actuator fixed to the magnetic head slider.

As will be noted form FIGS. 25 and 26, in this embodiment, the coupling section 41 of the actuator 22 has a shape such that a rectangular projection 41b is protruded frontward from the strip and lateral jutting portions 41c are protruded in lateral directions from the projection 41b.

On this projection 41b, the head element connection pads 29a–29d are formed. Thus, even if trace conductors are connected to the connection pads 29a–29d by the GBB (gold ball bonding), it is possible to bear the force applied to the connection pads. The SBB (solder ball bonding) may be used for connecting the trace conductors with the connection pads instead of the GBB.

The lateral jutting portions 41c operate as a limiter for preventing the top end section of the flexure 26 from excessively moving toward up-and-down directions when a shock is applied to the In this embodiment, as shown in FIG. 27, no trace is preliminarily formed on the flexure 26 in this modification.

As shown in FIG. 28b, on the rear surface of the actuator, the first conductor member 170a consisting of a conductor sheet of a thin-film multi-layer pattern is formed or disposed. This conductor sheet 170a includes two for each side, thus four trace conductors one ends of which are electrically connected to the head element connection pads 29a–29d formed on the projection 41b of the actuator 22. The conductor sheet 170a is formed by sequentially depositing a first insulation material layer made of a resin such as polyimide with a thickness of about 5 μm, a patterned Cu layer (trace conductor layer) with a thickness of about 4 μm, and a second insulation material layer made of a resin such as polyimide with a thickness of about 5 μm in this order.

On the other hand, as shown in FIG. 28a, on the front surface of the actuator, a second section 172b of the second conductor member 170b of a thin-film multi-layered pattern is formed or disposed. The second section 172b consists of a conductor member, formed on the actuator 22, including three trace conductors one ends of which are electrically connected to actuator connection pads 173a and 173b and to a ground connection pad 173c. The other ends of the trace conductors in the second section 172b are electrically connected to the B channel and A channel signal terminals 42c and 43c and the ground terminals 42d and 43d formed on the movable arms 42 and 43 of the actuator 22, respectively.

As shown in FIG. 28b, at the midpoint of the conductor sheet 170a, interconnection pads 171a, 171b and 171c which are electrically connected to the actuator connection pads 173a and 173b and to the ground connection pad 173c, respectively are formed. One ends of three trace conductors in a first section 172a of the second conductor member 170b are electrically connected to the interconnection pads 171a, 171b and 171c, respectively.

According to this embodiment, since the first conductor member 170a including the trace conductors connected to the head element connection pads 29a–29d is formed on the movable arms 42 and 43, all the trace conductors connected to the head element and the actuator can be provided by a conductor pattern fabricated in the same process. Therefore, the traces become simple and also the manufacturing cost can be reduced. Furthermore, since the first conductor member 170a is adhered in parallel on the movable arms 42 and 43, the movement direction of the arms 42 and 43 intersect the plane of the member 170a. Thus, not only the resistance against the displacement of the movable arms 42 and 43 will decrease but also the trace conductors in the member 170a will not forcedly bend causing no damage to them.

Other configurations, operations, advantages and modifications in this embodiment are the same as those in the embodiment of FIG. 1. Also, in FIGS. 25 to 28b of this embodiment, the similar elements as those in the embodiment of FIG. 1 and in its modifications are represented by the same reference numerals.

Figure 29:
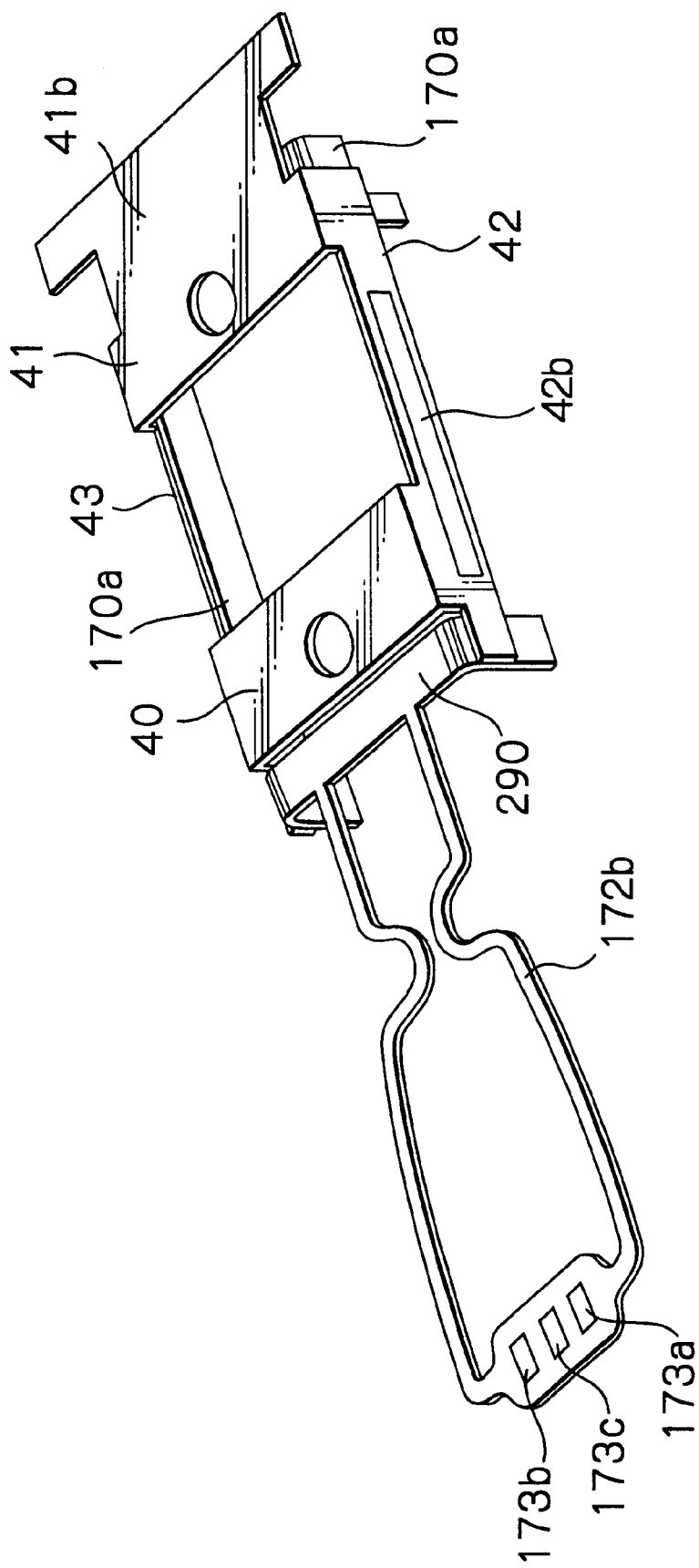
FIG. 29 is an oblique view illustrating the actuator with a conductor sheet in a modification of the embodiment of FIG. 25.
Figure 30:
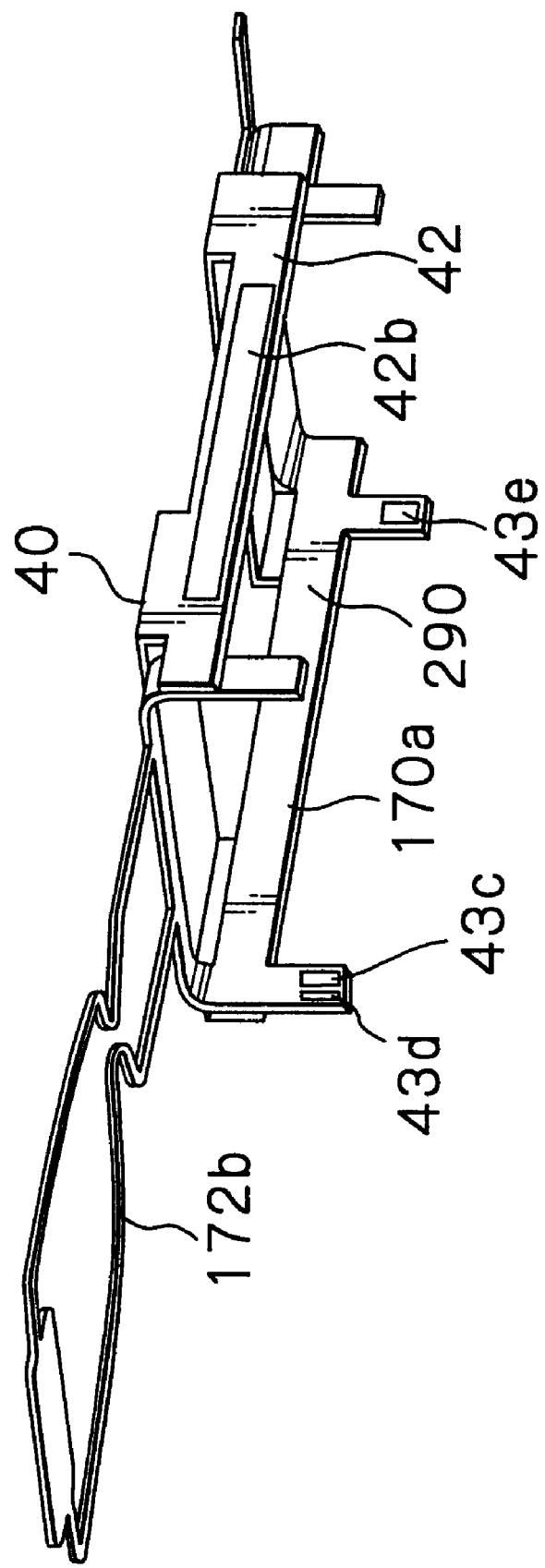
FIG. 30 is an oblique view illustrating the actuator seen from a different direction from FIG. 29.
Figure 31:
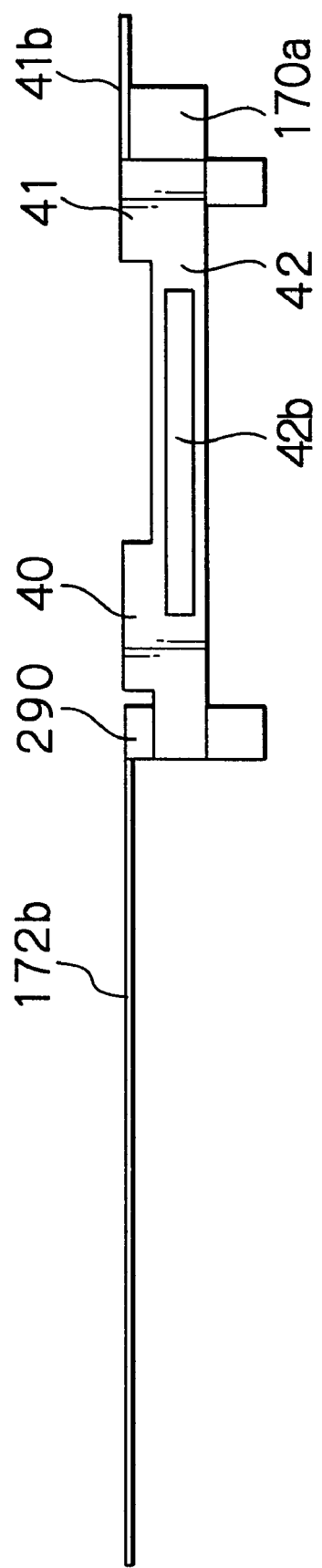
FIG. 31 is a side view illustrating the structure of the actuator of FIG. 29.

FIG. 29 illustrates the actuator with a conductor sheet in a modification of the embodiment of FIG. 25, FIG. 30 illustrates the actuator seen from a different direction from FIG. 29, and FIG. 31 is a side view of the actuator.

FIGS. 29 and 30 are indicated by turning the actuator shown in FIGS. 2 and 3 upside down and thus the upper surface of a base section of the actuator will be fixed to the suspension.

In this modification, on the rear surface of the actuator, a single conductor sheet 290 consisting of the first conductor member 170a and the second section 172b of the second conductor m of a thin-film multi-layered pattern is formed or disposed. In FIGS. 29 to 31 of this modification, the similar elements as those in the embodiment of FIG. 25 are represented by the same reference numerals.

This conductor sheet 290 is formed by sequentially depositing a first insulation material layer made of a resin such as polyimide with a thickness of about 5 μm, a patterned Cu layer (trace conductor layer) with a thickness of about 4 μm, and a second insulation material layer made of a resin such as polyimide with a thickness of about 5 μm in this order.

The second section 172b of the second conductor member formed on the conductor sheet 290 includes trace conductors one ends of which are inwardly bent and are electrically connected to the B channel and A channel signal terminals 42c and 43c and the ground terminals 42d, 43d, 42e and 43e formed on the movable arms 42 and 43 of the actuator 22, respectively.

The conductor sheet 290 is formed on a metal plate for the actuator before bending it. When bending the metal plate, the conductor sheet 290 will follow without receiving unnecessary stress.

According to this modification, since all the trace conductors connected to the head element and the actuator can be provided by a conductor pattern fabricated in the same process as the conductor sheet 290, the traces become simple and also the manufacturing cost can be reduced. Furthermore, since the first conductor member 170a is adhered in parallel on the movable arms 42 and 43, the movement direction of the arms 42 and 43 intersect the plane of the member 170a. Thus, not only the resistance against the displacement of the movable arms 42 and 43 will decrease but also the trace conductors in the member 170a will not forcedly bend causing no damage to them.

Other configurations, operations, and advantages in this modification are the same as those in the embodiment of FIG. 25.

Figure 32:
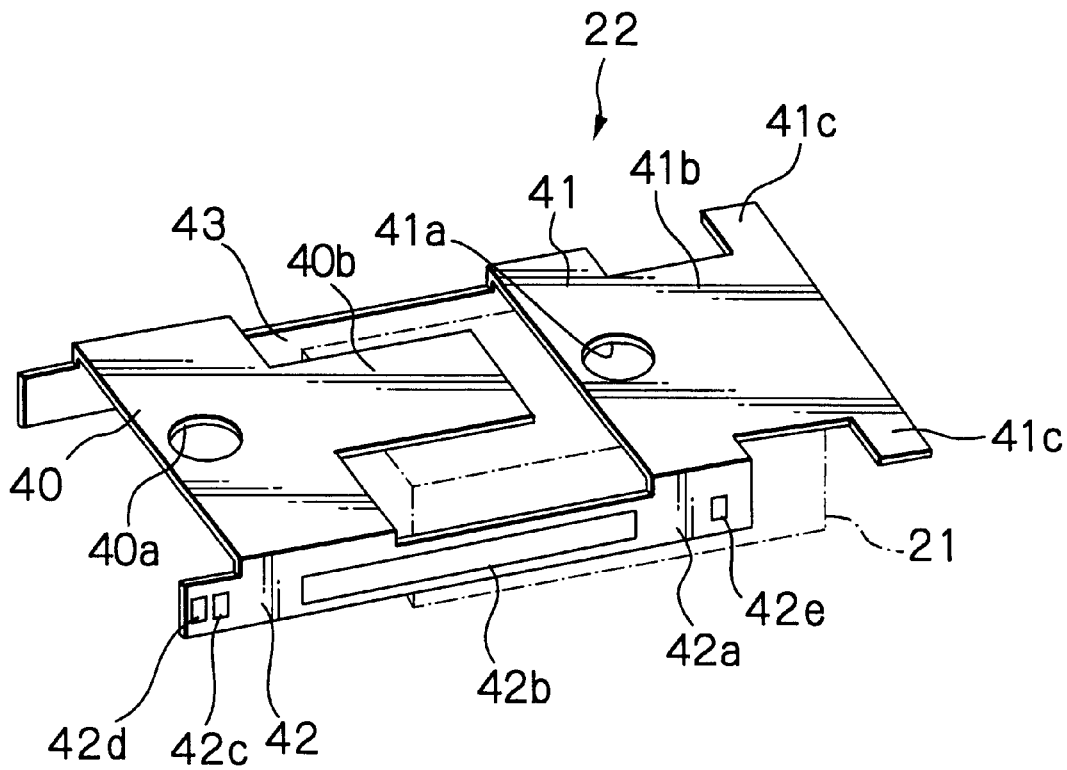
FIG. 32 is an oblique view illustrating a structure of an actuator in a still further embodiment according to the present invention.
Figure 33:
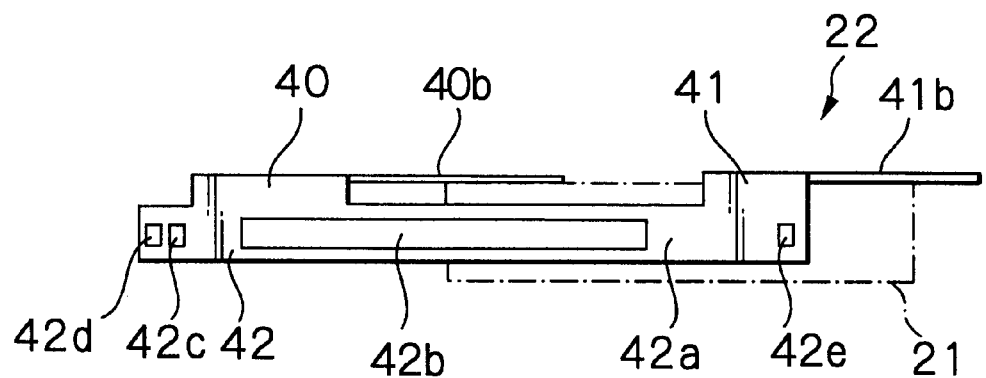
FIG. 33 is a side view illustrating the structure of the actuator of FIG. 32.

FIG. 32 illustrates a structure of an actuator in a still further embodiment according to the present invention, and FIG. 33 is a side view of the actuator of FIG. 32.

FIGS. 32 and 33 are indicated by turning the actuator shown in FIGS. 2 and 3 upside down and thus the upper surface of a base section of the actuator will be fixed to the suspension.

As will be noted from FIGS. 32 and 33, in this embodiment, the base section 40 of the actuator 22 has a shape such that a rectangular projection 40b is protruded frontward from the strip as in the embodiment of FIG. 19 and the coupling section 41 of the actuator 22 has a shape such that a rectangular projection 41b is protruded frontward from the strip and parts 41c are protruded in lateral directions from the projection 41b as in the embodiment of FIG. 25.

The area of the base section 40, contributed to adhesion with the tongue 26a of the flexure 26, is enlarged by forming this projection 40b, and thus the fixing strength between the suspension and the actuator can be greatly increased as well as in the embodiment of FIG. 19.

Other configurations, operations, advantages and modifications in this embodiment are the same as those in the embodiments of FIGS. 19 and 25. Also, in FIGS. 32 and 33 of this embodiment, the similar elements as those in the embodiments of FIGS. 19 and 25 and in their modifications are represented by the same reference numerals.

In the aforementioned embodiments, the precise positioning actuators for the thin-film magnetic head elements and the HGAs with the actuators are described. However, it is apparent that the present invention can be applied to a precise positioning actuator for a head element such as an optical head element other than the thin-film magnetic head element and an HGA with the actuator.

Many widely different embodiments of the present invention may be constructed without departing from the spirit and scope of the present invention. It should be understood that the present invention is not limited to the specific embodiments described in the specification, except as defined in the appended claims.

What is claimed is:

1. A precise positioning actuator to be fixed to a head slider provided with at least one head element and to a support, for precisely positioning said at least one head element, said actuator comprising:
    a pair of movable arms each formed by a metal plate to be substantially in parallel with a side surface of said head slider, top end sections of said pair of movable arms being capable of displacing in response to a drive signal applied to said actuator along a direction crossing planes of said metal plate; and
    a coupling section connected between said top end sections of said pair of movable arms and formed by a metal plate to be substantially in parallel with a first surface of said head slider, said first surface being opposite to an air bearing surface of said head slider, said first surface of said head slider being to be fixed to said coupling section.

2. The actuator as claimed in claim 1, herein said actuator further comprises a base section formed by a metal plate that is in parallel with said coupling section, and fixed to said support, said pair of movable arms extending forward from said base section.

3. The actuator as claimed in claim 2, wherein said pair of movable arms also extend backward from said base section.

4. The actuator as claimed in claim 2, wherein said pair of movable arms, said base section and said coupling section have a U-shaped section structure formed by bending a single metal plate.

5. The actuator as claimed in claim 2, wherein said base section has a strip shape.

6. The actuator as claimed in claim 2, wherein said base section comprises a strip and a projection protruded forward from the strip.

7. The actuator as claimed in claim 1, wherein said coupling section has a strip shape.

8. The actuator as claimed in claim 1, wherein said coupling section comprises a strip and a projection protruded forward from the strip.

9. The actuator as claimed in claim 8, wherein said coupling section further comprises lateral jutting portions protruded from said projection so as to operate as a limiter for preventing a top end section of the actuator from excessively moving toward up-and-down directions when a shock is applied.

10. The actuator as claimed in claim 1, wherein each of said pair of movable arms comprises an arm member made of the metal plate, and a piezoelectric element formed or adhered on a side surface of said arm member.

11. The actuator as claimed in claim 10, wherein said piezoelectric element has a multi-layered structure of piezoelectric material layers and of electrode layers.

12. The actuator as claimed in claim 10, wherein said piezoelectric element has a single layer structure of a piezoelectric material layer and of an electrode layer.

13. The actuator as claimed in claim 1, wherein said metal plate is a stainless steel plate.

14. The actuator as claimed claim 1, wherein conductor traces for transmitting signals of said head element are formed on said pair of movable arms.

15. The actuator as claimed claim 1, wherein said at least one head element is at least one thin-film magnetic head element.

16. A head gimbal assembly including a head slider provided with at least one head element, a support and a precise positioning actuator fixed to said head slider and to said support for precisely positioning said at least one head element, said actuator comprising:
  a pair of movable aims each formed by a metal plate that is substantially in parallel with a side surface of said head slider, top end sections of said pair of movable arms being capable of displacing in response to a drive signal applied to said actuator along a direction crossing planes of said metal plate;
  a coupling section connected between said top end sections of said pair of movable arms and formed by a metal plate that is substantially in parallel with a first surface of said head slider, said first surface being opposite to an air bearing surface of said head slider, said first surface of said head slider being fixed to said coupling section; and
  a base section formed by a metal plate that is in parallel with said coupling section, and fixed to said support, said pair of movable arms extending forward from said base section.

17. The head gimbal assembly as claimed in claim 16, wherein said pair of movable arms of said actuator also extend backward from said base section.

18. The head gimbal assembly as claimed in claim 16, wherein said pair of movable arms, said base section and said coupling section of said actuator have a U-shaped section structure formed by bending a single metal plate.

19. The head gimbal assembly as claimed in claim 16, wherein said base section of said actuator has a strip shape.

20. The head gimbal assembly as claimed in claim 16, wherein said base section of said actuator comprises a strip and a projection protruded forward form the strip.

21. The head gimbal assembly as claimed in claim 16, wherein said coupling section of said actuator has a strip shape.

22. The head gimbal assembly as claimed in claim 16, wherein said coupling section of said actuator comprises a strip and a projection protruded forward from the strip.

23. The head gimbal assembly as claimed in claim 22, wherein said coupling section of said actuator further comprises lateral jutting portions protruded from said projection so as to operate as a limiter for preventing a top end section of the actuator from excessively moving toward up-and-down directions when a shock is applied.

24. The head gimbal assembly as claimed in claim 16, wherein each of said pair of movable arms of said actuator comprises an arm member made of the metal plate, and a piezoelectric element formed or adhered on a side surface of said arm member.

25. The head gimbal assembly as claimed in claim 24, herein said piezoelectric element has a multi-layered structure of piezoelectric material layers and of electrode layers.

26. The head gimbal assembly as claimed in claim 24, wherein said piezoelectric element has a single layer structure of a piezoelectric material layer and of an electrode layer.

27. The head gimbal assembly as claimed in claim 16, wherein said metal plate of said actuator is a stainless steel plate.

28. The head gimbal assembly as claimed in claim 16, wherein conductor traces in said actuator, for transmitting signals of said head element, are formed on said pair of movable arms.

29. The head gimbal assembly as claimed in claim 16, wherein said at least one head element is at least one thin-film magnetic head element.

30. The head gimbal assembly as claimed in claim 16, wherein said coupling section of said actuator and said head slider are fixed by adhering.

31. The head gimbal assembly as claimed in claim 16, wherein said coupling section of said actuator and said head slider are adhered by a conductive adhesive.

32. The head gimbal assembly as claimed in claim 16, wherein said actuator and said support are fixed by adhering or by laser welding.

33. A manufacturing method of a head gimbal assembly comprising the steps of:
  preparing a head slider provided with at least one head element, a support and a precise positioning actuator having a pair of movable arms each formed by a metal plate to be substantially in parallel with a side surface of said head slider, top end sections of said pair of movable arms being capable of displacing in response to a drive signal applied to said actuator along a direction crossing planes of said metal plate, a coupling section connected between said top end sections of said pair of movable arms and formed by a metal plate to be substantially in parallel with a first surface of said head slider, said first surface being opposite to an air bearing surface of said head slider, and a base section formed by a metal plate that is in parallel with said coupling section, said pair of movable arms extending forward form said base section;
  fixing said first surface of said head slider to said coupling section of said actuator; and
  then fixing said base section of said actuator with said head slider to said support.

34. The manufacturing method as claimed in claim 33, wherein said method further comprises a step of inserting a spacer between said base section of said actuator and said head slider before said step of fixing said head slider to said coupling section.

35. The manufacturing method as claimed in claim 33, wherein said step of preparing the actuator includes bending a metal plate to form said pair of movable arms, said coupling section and said base section.

36. A manufacturing method of a head gimbal assembly comprising the steps of:
  preparing a head slider provided with at least one head element, a support and a precise positioning actuator having a pair of movable arms each formed by a metal plate to be substantially in parallel with a side surface of said head slider, top end sections of said pair of movable arms being capable of displacing in response to a drive signal applied to said actuator along a direction crossing planes of said metal plate, a coupling section connected between said top end sections of said pair of movable arms and formed by a metal plate to be substantially in parallel with a first surface of said head slider, said first surface being opposite to an air bearing surface of said head slider, and a base section formed by a metal plate that is in parallel with said coupling section, said pair of movable arms extending forward from said base section;
  fixing said base section of said actuator to said support; and
  then fixing said first surface of said head slider to said coupling section of said actuator.

37. The manufacturing method as claimed in claim 36, wherein said method further comprises a step of inserting a spacer between said base section of said actuator and said head slider before said step of fixing said head slider to said coupling section.

38. The manufacturing method as claimed in claim 36, wherein said step of preparing the actuator includes bending a metal plate to form said pair of movable arms, said coupling section and said base section.

* * * * *